(12) United States Patent
Kim et al.

(10) Patent No.: US 7,711,865 B2
(45) Date of Patent: May 4, 2010

(54) MULTI-STANDARD PROTOCOL STORAGE DEVICES

(75) Inventors: Yong-hyeon Kim, Gyeonggi-do (KR);
Tae-keun Jeon, Gyeonggi-do (KR);
Seong-hyun Kim, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 29 days.

(21) Appl. No.: 12/107,630

(22) Filed: Apr. 22, 2008

(65) Prior Publication Data

US 2008/0191034 A1    Aug. 14, 2008

(51) Int. Cl.
G06F 3/00   (2006.01)
G06F 13/12  (2006.01)

(52) U.S. Cl. .............................. 710/8; 710/10; 710/62

(58) Field of Classification Search ...................... 710/8, 710/10, 62
See application file for complete search history.

(56) References Cited

U.S. PATENT DOCUMENTS

| | | | |
|---|---|---|---|
| 6,168,077 B1 | 1/2001 | Gray et al. | |
| 6,334,160 B1* | 12/2001 | Emmert et al. | ................. 710/11 |
| 6,439,464 B1 | 8/2002 | Fruhauf et al. | |
| 6,557,754 B2 | 5/2003 | Gray et al. | |
| 6,663,007 B1 | 12/2003 | Sun et al. | |
| 6,796,501 B2 | 9/2004 | Omet | |
| 6,851,014 B2 | 2/2005 | Chang et al. | |
| 6,857,038 B2 | 2/2005 | Liu et al. | |
| 7,171,502 B2 | 1/2007 | Jeon et al. | |
| 7,191,270 B2 | 3/2007 | Oh et al. | |
| 2003/0046472 A1 | 3/2003 | Morrow | |
| 2004/0070952 A1 | 4/2004 | Higuchi et al. | |
| 2004/0164170 A1* | 8/2004 | Krygier et al. | .............. 235/492 |

FOREIGN PATENT DOCUMENTS

| | | |
|---|---|---|
| DE | 100 59 948 A1 | 6/2002 |
| EP | 0 883 083 | 12/1998 |

(Continued)

OTHER PUBLICATIONS

French Search Report for French patent application 04 07430 mailed on Sep. 19, 2005.

(Continued)

*Primary Examiner*—Alford W Kindred
*Assistant Examiner*—David E Martinez
(74) *Attorney, Agent, or Firm*—Myers Bigel Sibley & Sajovec, P.A.

(57) ABSTRACT

A movable storage device combined with a smart card can include a plurality of signal pins that are connected to at least one of a plurality of memory card hosts that use different communications protocols from each other or a smart card host, and at least one signal pin that is used as a mode distinguishing pin. A mode deciding unit can decide on an operation mode, which can be a smart card mode and/or a memory card mode based on a level of a first initial input signal received from the mode distinguishing pin. A smart card module can communicate with a smart card host in a smart card mode and a memory card module can be interfaced with memory card hosts, and communicates with a memory card host connected in a memory card mode and stores data.

20 Claims, 24 Drawing Sheets

FOREIGN PATENT DOCUMENTS

KR  10-2004-0021968  3/2004

OTHER PUBLICATIONS

Notice to Submit a Response for Korean Patent Application No. 10-2003-0076729 mailed on Nov. 14, 2005.

German Office Action for Application No. 10 2004 033 3637-53; Nov. 13, 2006.

Office Action for corresponding German patent application 102004033363.7-53; dated May 21, 2007.

* cited by examiner

FIG. 7A

| PIN NUMBER | MMC MODE | | | SPI MODE | | |
|---|---|---|---|---|---|---|
| | NAME | TYPE | INITIAL STATE | NAME | TYPE | INITIAL STATE |
| 1 | RSV | NC | FLOATING OR LOGICAL HIGH | CS | I | HIGH |
| 2 | CMD | I/O/PP/OD | HIGH | DI | I/PP | HIGH |
| 5 | CLK | I | HIGH | SCLK | I | HIGH |
| 7 | DAT | I/O/PP | HIGH | DO | O/PP | UNKNOWN |

FIG. 7B

| PIN NUMBER | SIGNAL NAME | TYPE | INITIAL STATE |
|---|---|---|---|
| 2 | D− | I/O | INPUT MODE ; IN A LOW LEVEL CAUSED BY PULL-DOWN RESISTANCE |
| 3 | D+ | I/O | INPUT MODE ; IN A LOW LEVEL CAUSED BY PULL-DOWN RESISTANCE |

FIG. 7C

| PIN NUMBER | MMC MODE | | | SPI MODE | | |
|---|---|---|---|---|---|---|
| | NAME | TYPE | DESCRIPTION | NAME | TYPE | DESCRIPTION |
| 1 | RSV | NC | RESERVED | CS | I | CHIP SELECT (NEG TRUE) |
| 2 | CMD | I/O/PP/OD | COMMAND/RESPONSE | DI | I/PP | DATA IN |
| 3 | VSS1 | S | SUPPLY VOLTAGE GROUND | VSS1 | S | SUPPLY VOLTAGE GROUND |
| 4 | VDD | S | SUPPLY VOLTAGE | VDD | S | SUPPLY VOLTAGE |
| 5 | CLK | I | CLOCK | SCLK | I | CLOCK |
| 6 | VSS2 | S | SUPPLY VOLTAGE GROUND | VSS2 | S | SUPPLY VOLTAGE GROUND |
| 7 | DAT | I/O/PP | DATA | DO | O/PP | DATA OUT |

FIG. 7D

| PIN NUMBER | SIGNAL NAME | TYPE | DESCRIPTION |
|---|---|---|---|
| 1 | VBUS | S | SUPPLY VOLTAGE |
| 2 | D- | I/O | D+ DATA |
| 3 | D+ | I/O | D- DATA |
| 4 | GND | S | SUPPLY VOLTAGE GROUND |

| PIN NUMBER | SIGNAL NAME | TYPE | INITIAL STATE |
|---|---|---|---|
| 2 | RST | I | LOW |
| 3 | CLK | I | UNKNOWN |
| 4 | IO | I/O | HIGH |

FIG. 16B

| PIN NUMBER | SIGNAL NAME | TYPE | DESCRIPTION |
|---|---|---|---|
| 1 | VDD | S | SUPPLY VOLTAGE |
| 2 | RST | I | SYSTEM RESET |
| 3 | CLK | I | EXTERNAL CLOCK |
| 4 | IO | I/O | SERIAL DATA |
| 5 | VSS | S | SUPPLY VOLTAGE GROUND |

MULTI-STANDARD PROTOCOL STORAGE DEVICES

CROSS-REFERENCE TO RELATED APPLICATION

This application claims the priority of Korean Patent Application Nos. 2003-45412 and 2003-76729, filed on Jul. 4, 2003 and Oct. 31, 2003, respectively, in the Korean Intellectual Property Office and U.S. patent application Ser. No. 10/884,145, filed on Jul. 2, 2004 the disclosures of which are incorporated herein in their entireties by reference.

FIELD OF THE INVENTION

The invention relates to a storage device, and more particularly, to a movable storage device.

BACKGROUND

In general, movable storage devices like multimedia cards (MMC), secure digital (SD) memory cards, compact flash (CF) cards, and memory sticks are used in movable digital devices (i.e. hosts) like camcorders, digital cameras, PDAs (personal digital assistance), and MP3s (MPEG-1 Layer 3). The devices communicate with the hosts in different protocols. Therefore, each movable storage device may only be connected to a host that communicates in a corresponding communication protocol. On the other hand, a smart card that communicates in a corresponding communication protocol form can be connected to a smart card host like a mobile phone.

FIG. 1 is a view illustrating a relationship between conventional movable storage devices and a smart card and corresponding hosts. Referring to FIG. 1, an MMC 12 can be connected to an MMC host 11 and a SD memory card 14 can be connected to a SD host 13. Similarly, a CF card 16 can be connected to a CF host 15 and a smart card 18 can be connected to a smart card host 17.

As previously described, conventional movable storage devices cannot be used in hosts that do not communicate using the same protocol. For example, in order for the MMC 12 to be connected to a PC (not shown), an additional universal serial bus (USB) reader that converts data of the MMC 12 according to protocols used in an USB device (which is a serial interface device used in the PC) may be required. Also, the MMC 12 can support the USB interface, added to an interface controller inside the MMC 12 without having to be equipped with the USB reader additionally. In this case, a method for controlling the MMC 12 to recognize the type of host connected to the device and to make the MMC 12 operate in a corresponding interface mode is needed. In a conventional controlling method, the MMC 12 has an additional pin and the MMC 12 operates in a corresponding interface mode in response to a control signal received from the host through the additional pin. However, the method is inefficient since the MMC 12 has to be equipped with the additional pin and the host has to generate an additional control signal for determining the operation mode of the MMC 12.

SUMMARY

Embodiments according to the invention can provide multi-standard protocol storage devices and methods of operating the same. Pursuant to these embodiments, a movable storage device combined with a smart card can include a plurality of signal pins that are connected to at least one of a plurality of memory card hosts that use different communications protocols from each other or a smart card host, and at least one signal pin that is used as a mode distinguishing pin. A mode deciding unit can decide on an operation mode, which can be a smart card mode and/or a memory card mode based on a level of a first initial input signal received from the mode distinguishing pin. A smart card module can communicate with a smart card host in a smart card mode and a memory card module can be interfaced with memory card hosts, and communicates with a memory card host connected in a memory card mode and stores data.

BRIEF DESCRIPTION OF THE DRAWINGS

FIG. 7A is a table showing specifications of a multimedia card (MMC) host;

FIG. 7B is a table showing specifications of a universal serial bus (USB) host;

FIG. 7C is a table showing specifications of an MMC;

FIG. 7D is a table showing specifications of a USB device;

FIG. 16B is a table of specifications of a smart card;

DETAILED DESCRIPTION OF EMBODIMENTS ACCORDING TO THE INVENTION

Figure 1:
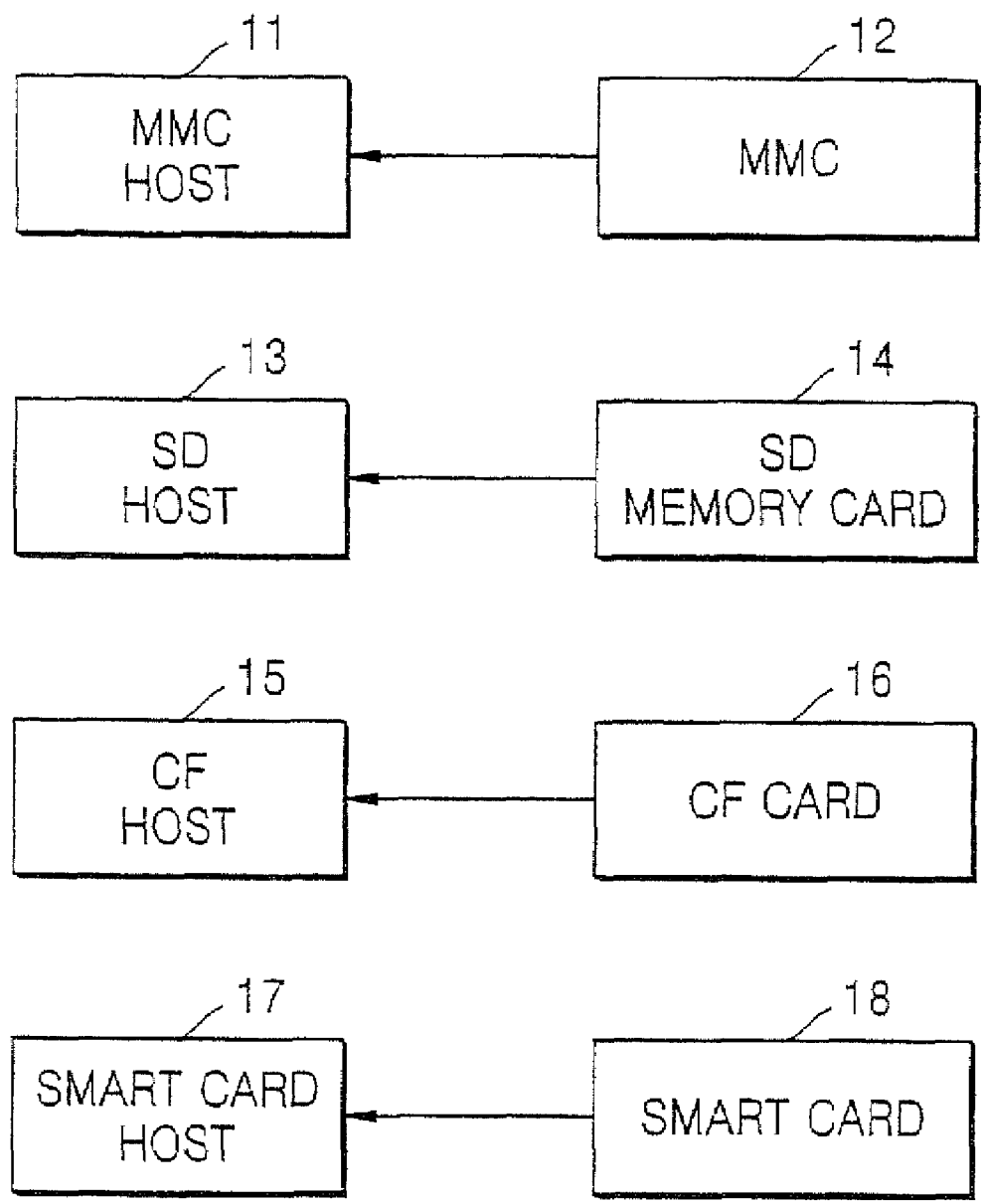
FIG. 1 is a view illustrating relationships between conventional movable storage devices and a smart card and corresponding hosts.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. As used herein the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
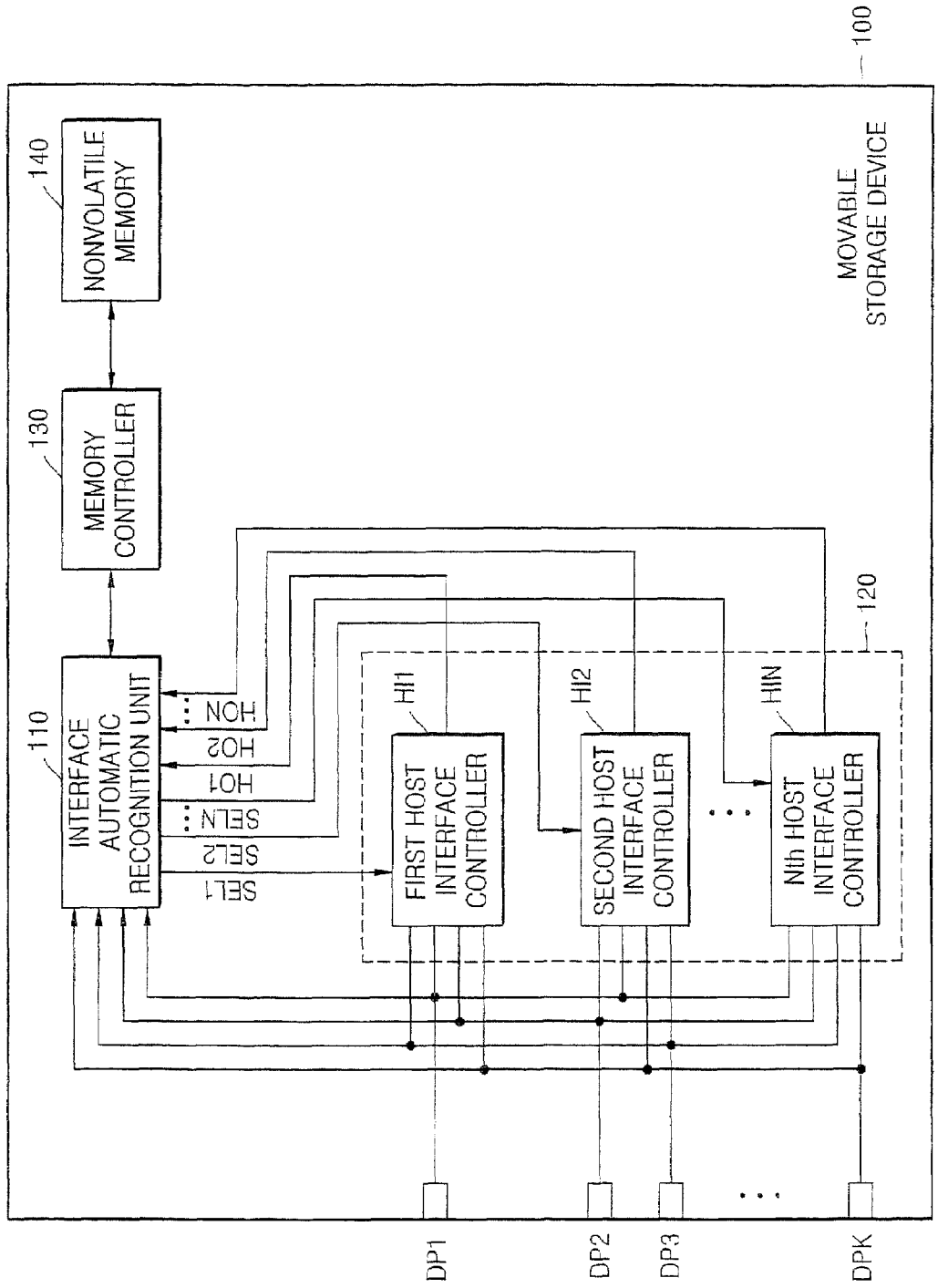
FIG. 2 is a block diagram of a movable storage device according to an embodiment of the invention.

FIG. 2 is a block diagram of a movable storage device (or multi-standard protocol storage device) according to an embodiment of the invention. Referring to FIG. 2, a movable storage device 100 includes a plurality of data pins DP1 through DPK, an interface automatic recognition unit 110, a host interface unit 120, a memory controller 130, and a nonvolatile memory 140. The host interface unit 120 has first through $N_{th}$ host interface controllers HI1 through HIN (N is an integer larger than 1).

The data pins DP1 through DPK (K is an integer larger than 1) are connected to data pins (not shown) of a host (not shown). At least one or more data pins DP1 through DPK can be used as a host distinguishing pin in the movable storage device 100. In the movable storage device 100 of FIG. 2, the plurality of data pins DP1 through DPK are used as the host distinguishing pins (that can conduct recognition signals used to determine the type of host and, therefore, the standard protocol to be used in communicating therewith). Also, after deciding the type of a host is connected to the movable storage device 100, the data pins DP1 through DPK are used as ordinary data pins.

When the movable storage device 100 is connected to the host, the interface automatic recognition unit 110 decides the type of the host that is connected according to a level of initial input signals received through the data pins DP1 through DPK (i.e., host distinguishing pins conducting recognition signals). Here, the initial input signal shows an initial state of a data bus inside the connected host. Also, depending on the results of the decision, the interface automatic recognition unit 110 enables one of the first through $N_{th}$ host interface controllers HI1 through HIN. In more detail, depending on the results of the decision, the interface automatic recognition unit 110 enables one of selection signals SEL1 through SELN (N is an integer larger than 1). In response to one signal enabled among the selection signals SEL1 through SELN, one of the first through $N_{th}$ host interface controllers HI1 through HIN is enabled. For example, when the selection signal SEL1 is enabled, in response to the selection signal SEL1, the first host interface controller HI1 is enabled. The interface automatic recognition unit 110 outputs an output signal HO1 that is received from the enabled first host interface controller HI1 to the memory controller 130.

Although FIG. 2 shows the interface automatic recognition unit 110 receiving the output signal HO1 and then outputting the output signal HO1 to the memory controller 130, the output signal HO1 can be directly inputted to the memory controller 130.

The first through $N_{th}$ host interface controllers HI1 through HIN use different communications protocols from each other, and each supports communications with hosts that use corresponding communications protocols.

The memory controller 130 exchanges data with a host that is connected through one selected from the first through $N_{th}$ host interface controllers HI1 through HIN, and controls read and write operations of data to and from the nonvolatile memory 140 and erase operation of the data stored in the nonvolatile memory 140. The nonvolatile memory 140 reads, writes, and erases the data under a control of the memory controller 130. In FIG. 2, a signal pass in which the memory controller 130 transmits data to a host that is connected through one selected from the first through $N_{th}$ host interface controllers HI1 through HIN is omitted in order to simplify the drawing.

Figure 3:
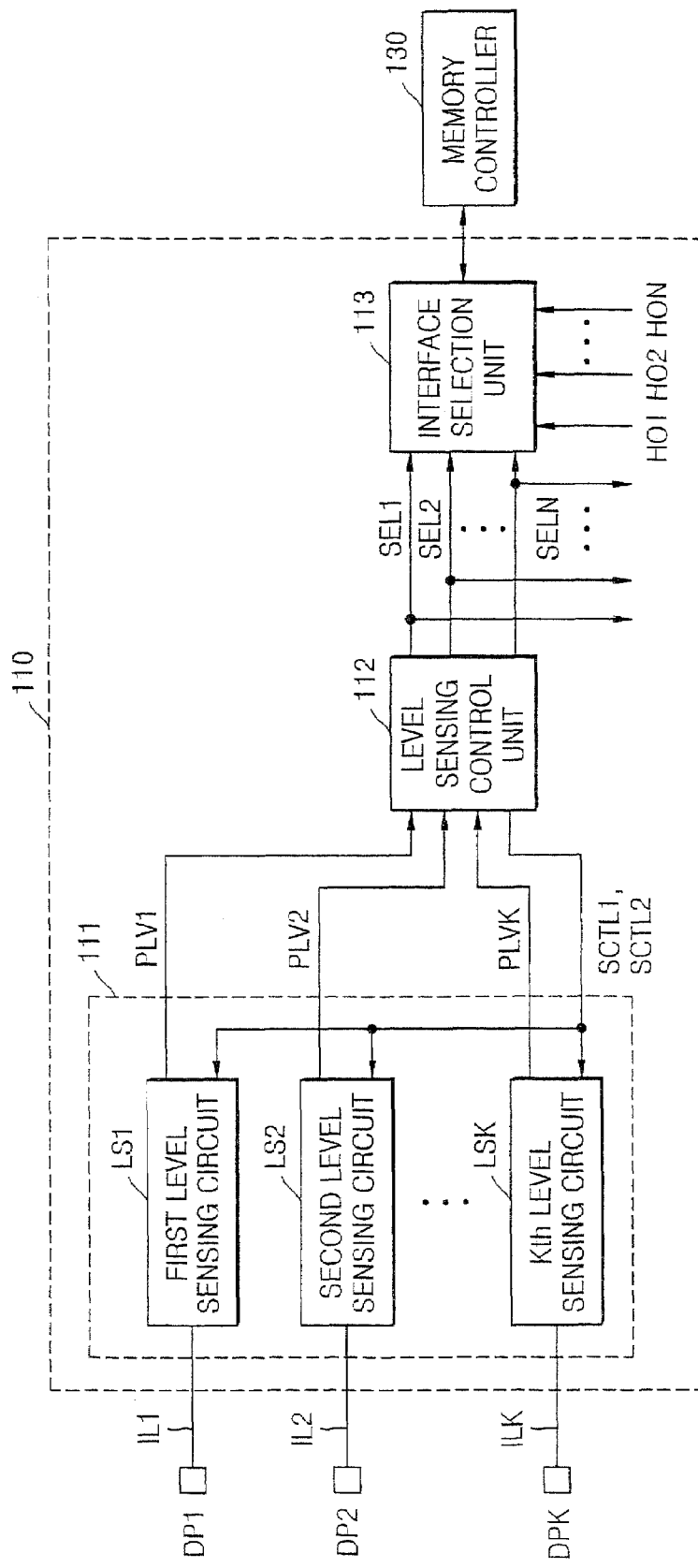
FIG. 3 is a block diagram of an interface automatic recognition unit and a memory controller of FIG. 2.

FIG. 3 is a block diagram of the interface automatic recognition unit (110) and the memory controller 130 of FIG. 2. Referring to FIG. 3, the interface automatic recognition unit 110 includes a level detection unit 111, a level sensing control unit 112, and an interface selection unit 113. The level detection unit 111 has a first through $K_{th}$ level sensing circuits LS1 through LSK (K is an integer). The level detection unit 111 has the same number of level sensing circuits as host distinguishing pins.

Input lines IL1 through ILK are connected to the respective host distinguishing pins, i.e., the data pins DP1 through DPK. The first through $K_{th}$ level sensing circuits LS1 through LSK respond to control signals SCTL1 and SCTL2 and are each connected to the input lines IL1 through ILK or each separated from the input lines IL1 through ILK.

When the data pins DP1 through DPK are connected to a host (not shown), the level sensing control unit 112 generates the control signals SCTL1 and SCTL2 and decides the level of initial input signals PLV1 through PLVK that are received through the first through $K_{th}$ level sensing circuits LS1 through LSK. Here, the initial input signals PLV1 through PLVK show an initial state of a data bus inside the connected host.

The level sensing control unit 112 decides the type of the host which is connected according to the level of the initial input signals PLV1 through PLVK, and outputs selection signals SEL1 through SELN in order to enable a host interface controller which corresponds to the type of the host. Then, the level sensing control unit 112 enables one of the selection signals SEL1 through SELN and outputs it.

In response to one signal that is enabled among selection signals SEL1 through SELN, the interface selection unit 113 selects one of output signals HO1 through HON the first through $N_{th}$ host interface controllers HI1 thorough HIN (see FIG. 2) and outputs it to the memory controller 130.

Figure 4A:
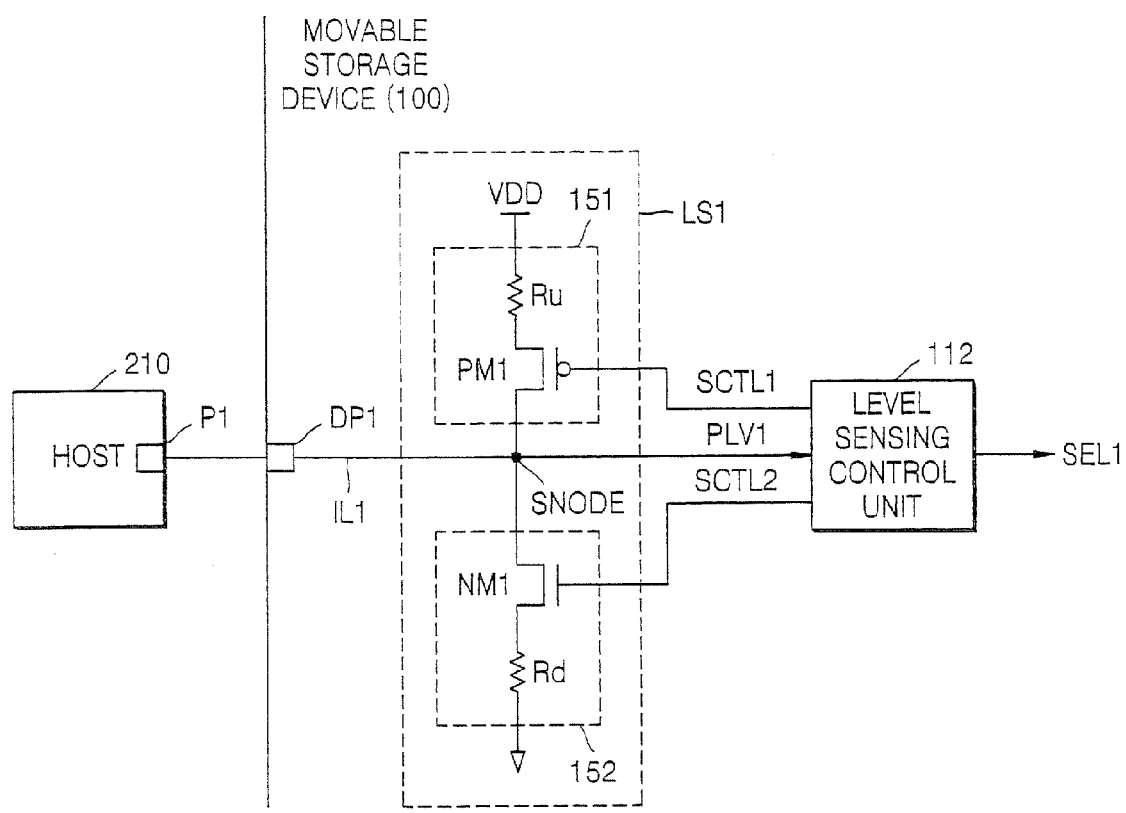
FIG. 4A is a detailed view of a first level sensing circuit, a level sensing control unit, and a host of FIG. 3.

Next, the structure and detailed operations of the level detection unit 111 and the level sensing control unit 112 will be described with reference to FIGS. 4A and 4B. FIG. 4A is a view of the first level sensing circuit LS1, the level sensing control unit 112, and a host 210. Here, the structure and detailed operations of the second through $K_{th}$ level sensing circuits LS2 through LSK are substantially the same as the structure and operations of the first level sensing circuit LS1. Referring to FIG. 4A, the data pin DP1 of the movable storage device 100 is connected to a data pin P1 of the host 210, and the input line IL1 is further connected to the data pin DP1. Here, when the host 210 is connected to the movable storage device 100, the data pin DP1 is initially used as a host distinguishing pin and after the movable storage device 100 decides the type of the host 210, the data pin DP1 is used as an ordinary data pin.

In FIG. 4A, the first level sensing circuit LS1 includes a first sensing circuit 151 and a second sensing circuit 152. The first sensing circuit 151 has a pull-up resistance Ru (or first load) and a first switching circuit PM1, and the second sensing circuit 152 has a pull-down resistance Rd (or second load) and a second switching circuit NM1. The first switching circuit PM1 can be a PMOS transistor and the second switching circuit NM1 can be a NMOS transistor. In FIG. 4A, the first and second switching circuits PM1 and NM1, respectively, are each referred to as PMOS and NMOS transistors, respectively.

An internal voltage VDD and a source of the PMOS transistor PM1 are respectively connected to both ends of the pull-up resistance Ru. A ground voltage and a source of the NMOS transistor NM1 are respectively connected to both ends of the pull-down resistance Rd. Drains of the PMOS and NMOS transistors PM1 and NM1 are connected to a node SNODE of the input line IL1. Additionally, the control signal SCTL1 is inputted to a gate of the PMOS transistor PM1, and the control signal SCTL2 is inputted to a gate of the NMOS transistor NM1.

The PMOS transistor PM1 responds to the control signal SCTL1 and is turned on or off. As a result, the pull-up resistance Ru is connected in parallel to the input line IL1 or separated from the input line IL1. When the pull-up resistance Ru is connected to the input line IL1, the internal voltage VDD is supplied to the input line IL1. The NMOS transistor NM1 responds to the control signal SCTL2 and is turned on or off. Consequently, the pull-down resistance Rd is connected in parallel to the input line IL1 or separated from the input line IL1. When the pull-down resistance Rd is connected to the input line IL1, the ground voltage is supplied to the input line IL1.

On the other hand, an initial input signal PLV1 from the host 210 is inputted to the level sensing control unit 112 through the data pin DP1 and the node SNODE. Although it is not illustrated in FIG. 4A, a pull-down resistance for a bus (not shown) can be connected in parallel to a data bus (not shown) inside the host 210, which is connected to a data pin P1 of the host 210. In this case, the pull-up resistance Ru of the first sensing circuit 151 has a resistance value much higher than the pull-down resistance for the bus. For example, when the pull-down resistance for the bus is 15 kΩ, the pull-up resistance Ru can be set to 1 MΩ. If a resistance value of the pull-up resistance Ru is set much higher than the pull-down resistance for the bus, the pull-up resistance Ru does not affect the level of the initial input signal PLV1. In other words, when the initial input signal PLV1 is high, even if the pull-up resistance Ru is connected to the input line IL1, the initial input signal PLV1 is maintained high. Conversely, when the initial input signal PLV1 is low, even if the pull-up resistance Ru is connected to the input line IL1, the initial input signal PLV1 is maintained low.

Similarly, although it is not illustrated in FIG. 4A, a pull-up resistance for a bus (not shown) can be connected in parallel to the data bus inside the host 210 which is connected to the data pin P1. In this case, the pull-down resistance Rd of the second sensing circuit 152 has a resistance value much higher than the pull-up resistance for the bus. For example, when the pull-up resistance for the bus is 15 kΩ, the pull-down resistance Rd can be set to 1 MΩ. If a resistance value of the pull-down resistance Rd is set much higher than the pull-up resistance for the bus, the pull-down resistance Rd does not affect the level of the initial input signal PLV1.

Figure 4B:
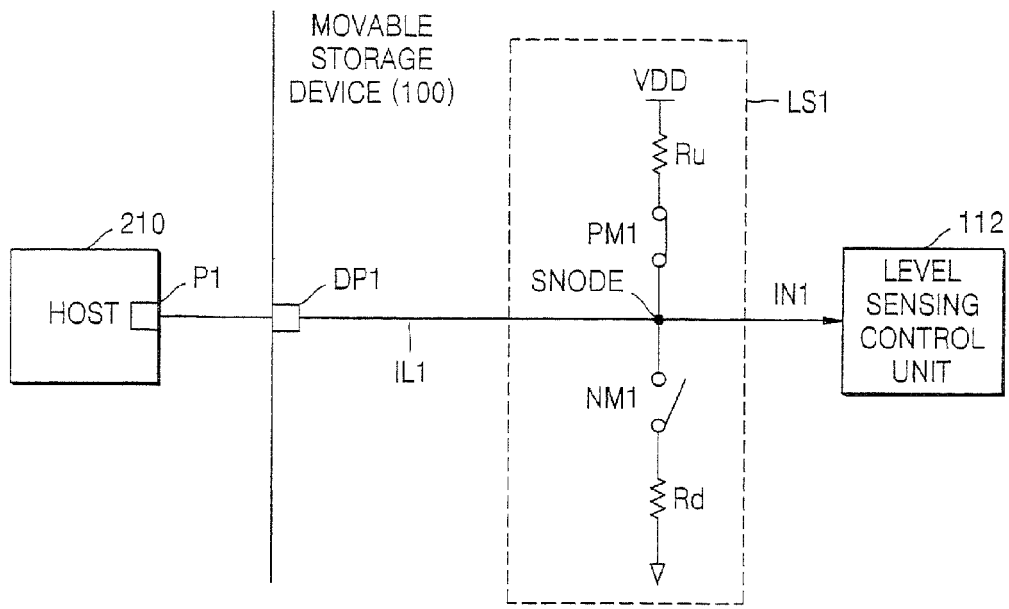
FIGS. 4B and 4C are views to explain an operation of the first level sensing circuit of FIG. 4A.
Figure 4C:
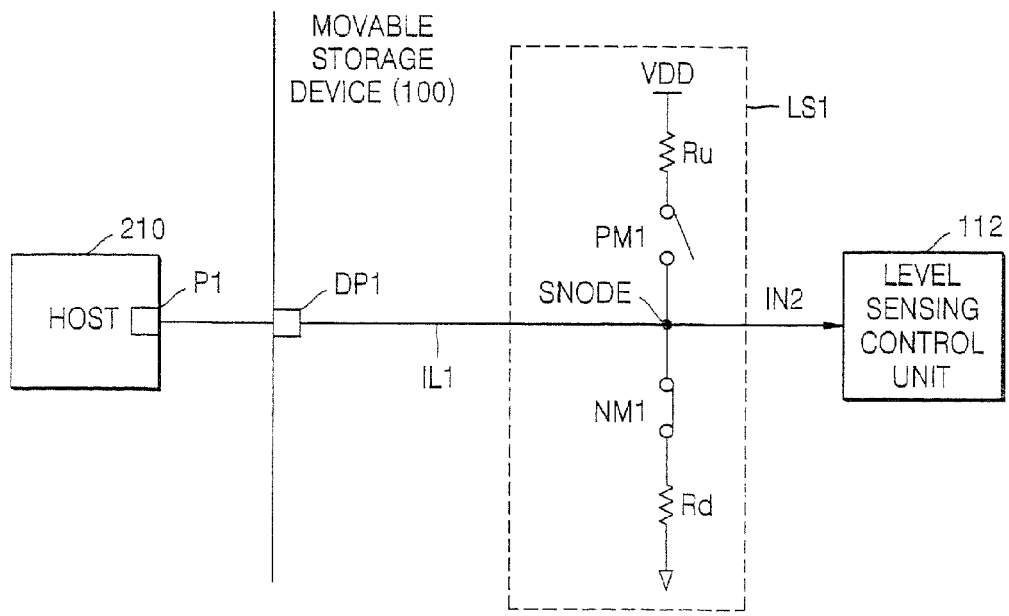

FIGS. 4B and 4C are views to explain an operation of the first level sensing circuit LS1 of FIG. 4A. FIG. 4B shows when the control signal SCTL1 is enabled, the PMOS transistor PM1 is turned on and the pull-up resistance Ru is connected to the input line IL1. Also, FIG. 4C shows when the control signal SCTL2 is enabled, the MNOS transistor NM1 is turned on and the pull-down resistance Rd is connected to the input line IL1.

When the movable storage device 100 is connected to the host 210, the level sensing control unit 112 alternately enables the control signals SCTL1 and SCTL2. As a result, after the pull-up resistance Ru is connected in parallel to the input line IL1, as seen in FIG. 4B, the pull-down resistance Rd is connected in parallel to the input line IL1, as seen in FIG. 4C.

When the pull-up resistance Ru is connected to the input line IL1, the level sensing control unit 112 measures the level of a first input signal IN1 received from the node SNODE. Also, when the pull-down resistance Rd is connected to the input line IL1, the level sensing control unit 112 measures the level of a second input signal IN2 received from the node SNODE. The level sensing control unit 112 decides the level of the initial input signal PLV1 according to the levels of the first and second input signals IN1 and IN2, respectively. In more detail, when both of the first and second input signals IN1 and IN2, respectively, are high, the level sensing control unit 112 decides that the initial input signal PLV1 is high. Also, when both of the first and second input signals IN1 and IN2, respectively, are low, the level sensing control unit 112 decides that the initial input signal PLV1 is low. Also, when the first input signal IN1 is high and the second input signal IN2 is low, the level sensing control unit 112 decides that the initial input signal PLV1 is in a floating state. In this case, the initial state of the data bus, which is inside the host 210 that is connected to the data pin P1, is in a floating state.

The level sensing control unit 112 decides the type of the host 210, which is connected according to the level of the initial input signal PLV1 (or recognition signal), and enables one of the selection signals SEL1 through SELN to enable a host interface controller that corresponds to the host. For example, when a first host interface controller HI1 corresponds to the host 210, the level sensing control unit 112 enables the selection signal SEL1 and outputs it.

Additionally, after deciding the type of the host 210, the level sensing control unit 112 disables all the control signals SCTL1 and SCTL2. Consequently, both the PMOS and NOMS transistors PM1 and NM1, respectively, are turned off and the full up and pull-down resistances Ru and Rd are both separated from the input line IL1. Afterwards, the data pin DP1 operates in an ordinary data pin. Also, the level sensing control unit 112 maintains the output of the selection signal SEL1 until the movable storage device 100 is separated from the host 210.

Figure 5A:
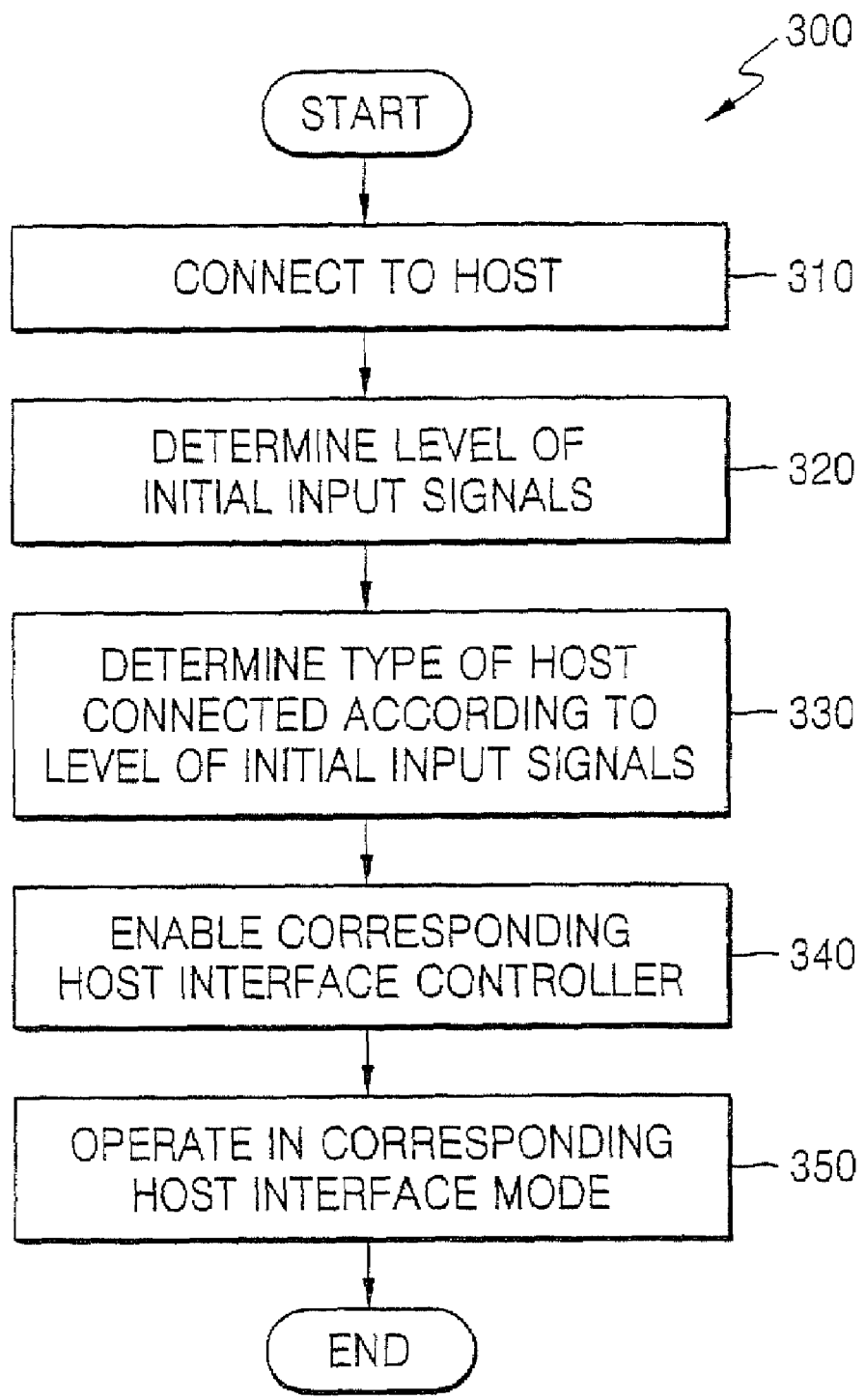
FIG. 5A is a flowchart of an interface process of the movable storage device of FIG. 2.

FIG. 5A is a flowchart of an interfacing process 300 of the movable storage device 100 of FIG. 2. Referring to FIG. 5A, the data pins DP1 through DPK of the movable storage device 100 are connected to the data pins of the host 210 (Step 310). Here, some or all the data pins DP1 through DPK can be used as the host distinguishing pins. In FIG. 5A, as an example, all of the data pins DP1 through DPK are used as the host distinguishing pins.

The interface automatic recognition unit 110 of the movable storage device 100 decides the level of initial input signals PLV1 through PLVK that are received through the host distinguishing pins DP1 through DPK (Step 320). Step 320 will be described in more detail with reference to FIG. 5B later.

The interface automatic recognition unit 110 decides the type of the host 210, which is connected according to the level of the initial input signals PLV1 through PLVK (Step 330). The interface automatic recognition unit 110 selects a host interfacing controller that corresponds to the host 210 from among the first through $N_{th}$ host interface controllers HI1 through HIN and enables it (Step 340). Afterwards, the movable storage device 100 operates in a corresponding host interface mode by the corresponding host interface controller which is enabled by the interface automatic recognition unit 110 until the movable storage device 100 is separated from the host 210 (Step 350).

Figure 5B:
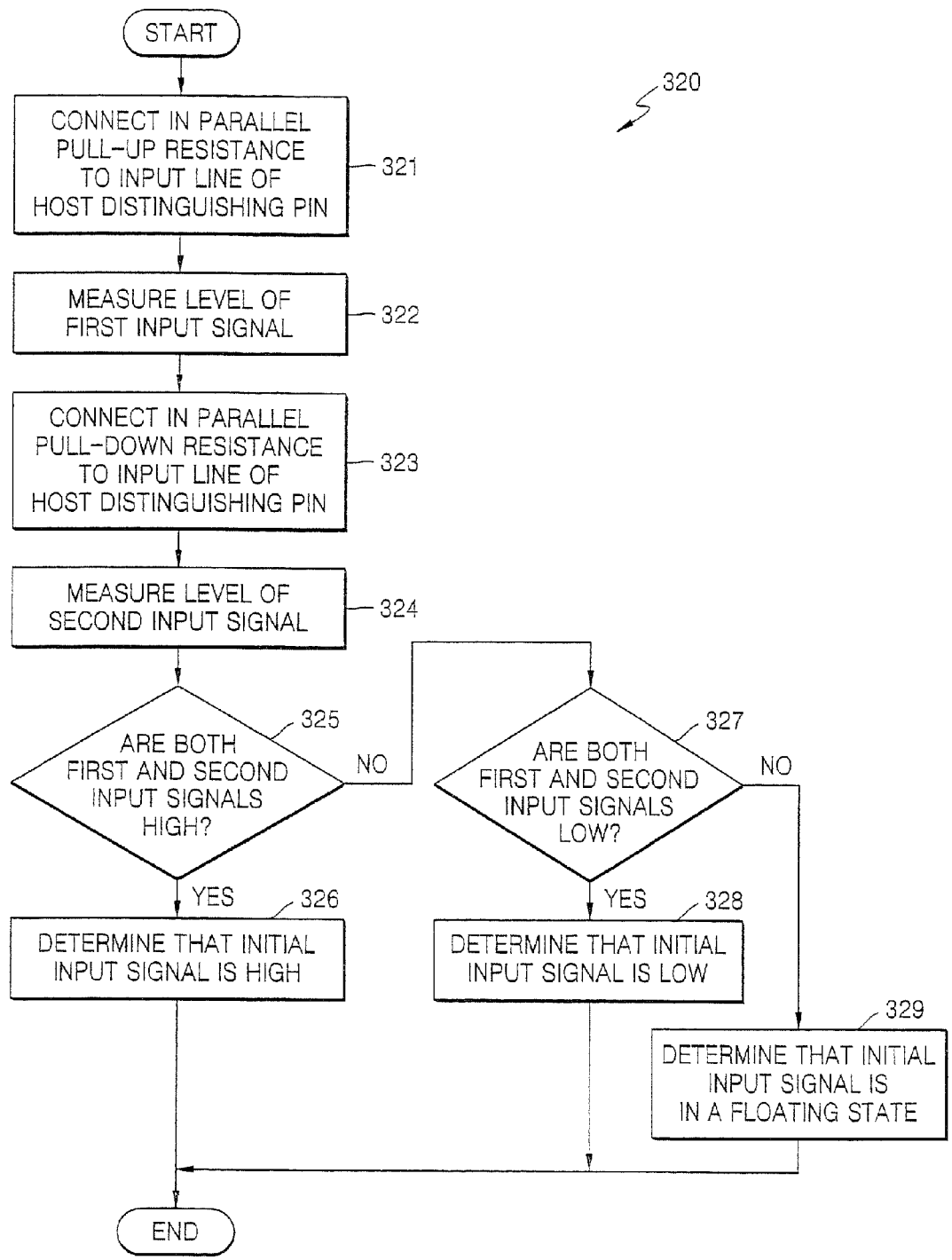
FIG. 5B is a flowchart of a level deciding process of an initial input signal of FIG. 5A in detail.

FIG. 5B is a flowchart of the level deciding process (Step 320) of the initial input signal of FIG. 5A in detail. In FIG. 5B, an operation of the first level sensing circuit LS1 of the interface automatic recognition unit 110 will be mainly described. The second through $K_{th}$ level sensing circuits LS2 through LSK of the interface automatic recognition unit 110 operates in the same way as the first level sensing circuit LS1.

First, as illustrated in FIGS. 4A and 4B, the level sensing control unit 112 of the interface automatic recognition unit 110 enables the control signal SCTL1. As a result, the PMOS transistor PM1 is turned on, and a pull-up resistance Ru is connected in parallel to the input line IL1 of the host distinguishing pin DP1 (Step 321). Then, the level sensing control unit 112 measures the level of the first input signal IN1 which is received from the node SNODE of the input line IL1 (Step 322). Next, the level sensing control unit 112 disables the control signal SCTL1 and enables the control signal SCTL2. Consequently, the PMOS transistor PM1 is turned off and the NMOS transistor NM1 is turned on and the pull-down resistance Rd is connected in parallel to the input line IL1 (Step 323). Here, the level sensing control unit 112 measures the level of the second input signal IN2 which is received from the node SNODE of the input line IL1 (Step 324).

Afterwards, the level sensing control unit 112 decides whether both the first and second input signals IN1 and IN2, respectively, are high (Step 325). If both the first and second input signals IN1 and IN2, respectively, are high, the level sensing control unit 112 decides that the initial input signal PVL1 is high (Step 326).

Also, in Step 325, if both the first and second input signals IN1 and IN2, respectively, are not high, the level sensing control unit 112 decides whether both the first and second input signals IN1 and IN2, respectively, are low (Step 327). If both the first and second input signals IN1 and IN2, respectively, are low, the level sensing control unit 112 decides that the initial input signal PVL1 is low (Step 328).

In Step 327, if both the first and second input signals IN1 and IN2, respectively, are not low (i.e. one of the first and second input signals IN1 and IN2 is high and the other is low), the level sensing control unit 112 decides that the initial input signal PVL1 is in a floating state (Step 329).

Here, the level of the initial input signal PVL1 shows an initial state of the data bus of the host 210 and the initial state of the data bus is different for each host. Thus, the level sensing control unit 112 can decide the type of the host according to the level of the initial input signal PVL1.

Figure 6:
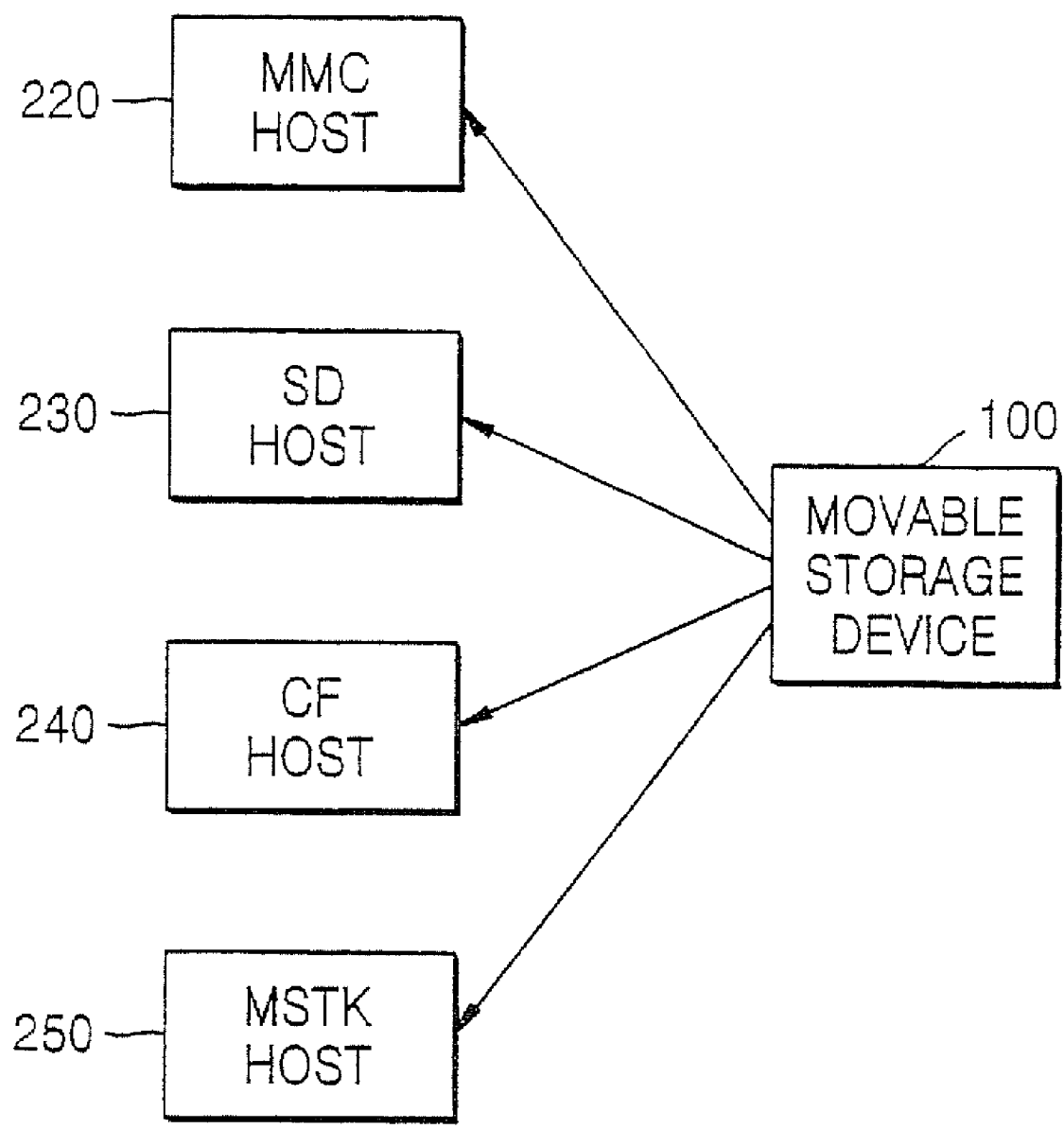
FIG. 6 is a view illustrating relationships between the movable storage device of FIG. 2 and hosts.

FIG. 6 is a view illustrating relationships between the movable storage device of FIG. 2 and hosts. Referring to FIG. 6, the movable storage device 100 can be connected to one of a multimedia card (MMC) host 220, a secure digital (SD) host 230, a compact flash (CF) host 240, and a memory stick (MSTK) host 250. In other words, the movable storage device 100 can be used in various hosts that use different communications protocols from each other. Also, the movable storage device 100 can be used in all types of hosts apart from hosts that use a movable storage device without a host interface controller. It will also be understood the hosts can each use respective standardized protocols to communicate. For example, MSTK can use a standard MSTK communications protocol so that any device can be interfaced to use an MSTK if the device uses the standard MSTK communications protocol for communications therewith.

FIG. 7A is a table showing specifications of an MMC host. Referring to FIG. 7A, the MMC host supports an MMC mode or a serial peripheral interface (SPI) mode. The table in FIG. 7A shows specifications of data pins 1, 2, 5, and 7 excluding power pins 3, 4, and 6. First, the specifications of the MMC host in the MMC mode will be explained. The data pin 1 is not used and the initial state of the data bus, which is connected to the data pin 1, is a floating state or high. The data pin 2 is used as a command signal CMD pin, the data pin 5 is used as a clock signal CLK pin, and the data pin 7 is used as a data DAT pin each, and the initial state of the data bus connected to each of the data pin is high.

Next, the specifications of the MMC host in the SPI mode will be explained. The data pin 1 is used as a chip selection signal CS pin, and the initial state of the data bus, which is connected to the data pin 1, is high. Also, the data pin 2 is used as a input data signal DI pin and the data pin 5 is used as a clock signal SCLK pin each, and the initial state of the data bus connected to each of the data pin is high. The data pin 7 is used as an output data signal DO pin and the initial state of the data bus connected to the data pin 7 is not prescribed.

FIG. 7B is a table showing specifications of a universal serial bus (USB) host. The table in FIG. 7B shows specifications of data pins 2 and 3 excluding power pins 1 and 4. The data pin 2 is used as an input data signal D− pin and the initial state of the data bus connected to the data pin 2 is low. The data pin 3 is used as an input data signal D+ pin and the initial state of the data bus connected to the data pin 3 is also low.

FIG. 7C is a table showing specifications of an MMC. Referring to FIG. 7C, the MMC includes seven pins 1 through 7 and supports an MMC mode and an SPI mode. The pins 1 through 7 of the MMC are each connected to corresponding data pins 1 through 7 of the MMC host.

FIG. 7D is a table showing specifications of a USB device. Referring to FIG. 7D, the USB device includes four pins 1 through 4 respectively connected to corresponding data pins 1 through 4 of the USB host.

As seen in FIGS. 7A and 7B, the initial state of the data bus connected to the data pin 1 which is used for the chip selection signal CS of the MMC host is different from the initial state of the data bus connected to data pin 2 or 3 which is used for the input data signals D− or D+ of the USB host. Therefore, in a movable storage device that has both an MMC and a USB interface controllers, when a specified data pin is used for an input data signal D− and D+ and a chip selection signal, the movable storage device can decide the type of a host that is connected according to the level of the initial input signal which is received from the connected host through the data pin.

Figure 8:
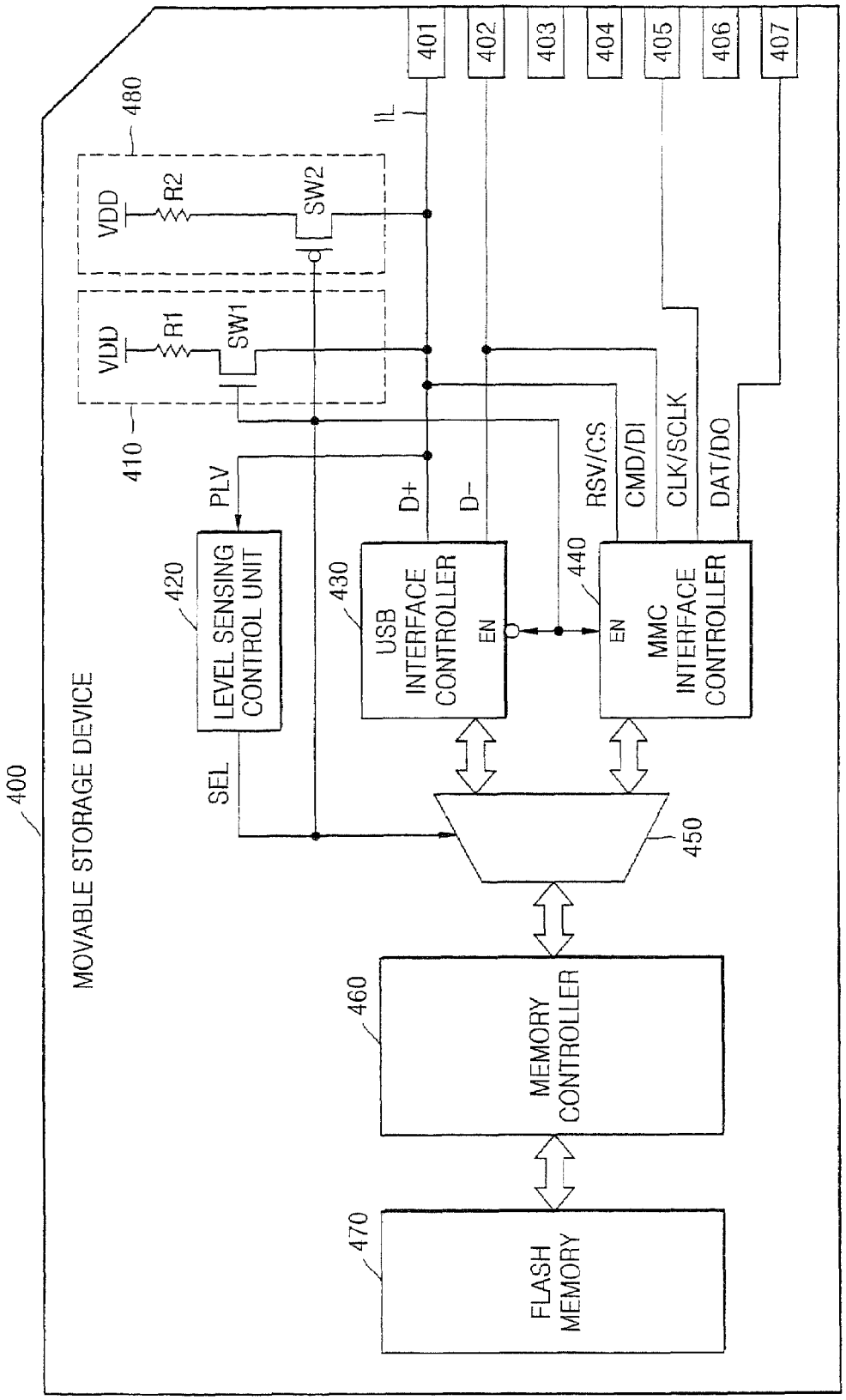
FIG. 8 is a view of a movable storage device according to another embodiment of the invention.

FIG. 8 is a view of a movable storage device according to another embodiment of the invention in which the movable storage device includes a USB and MMC interface controllers. In FIG. 8, a case in which a USB interface function is added to the MMC is illustrated. Referring to FIG. 8, a movable storage device 400 includes a plurality of data pins 401 through 407, a level sensing circuit 410, a level sensing control unit 420, a USB interface controller 430, an MMC interface controller 440, and an interface selection unit 450. Additionally, the movable storage device 400 further includes a memory controller 460, a flash memory 470, and a recognition signal for a USB host generation circuit 480. The data pins 403, 404, and 406 are used as pins for power supply, and the USB and MMC interface controllers 530 and 540, respectively, share the data pins 403, 404, and 406.

When the movable storage device 400 is connected to a USB host, the data pin 401 is used as an input data signal D+ pin, and one of the data pins 402, 405, and 407 is used as an input data signal D− pin. When the movable storage device 400 is connected to a USB host, the data pin 401 is used as an input data signal D− pin, and one of the data pins 402, 405, and 407 can be used as an input data signal D+ pin.

Also, the recognition signal for the USB host generation circuit 480 is connected to an input line IL of the data pin 401 when the movable storage device 400 operates in a USB host interface mode and the data pin 401 is used as the input data signal D+ pin.

The recognition signal for the USB host generation circuit 480 can be connected to an input line of one of the data pins 402, 405, and 407 when the movable storage device 400 operates in a USB host interface mode and one of the data pins 402, 405, and 407 is used as the input data signal D+ pin.

On the other hand, the data pin 401 is not used when the movable storage device 400 is connected to an MMC host and operates in an MMC mode, and the data pin 401 is used as a chip selection signal CS pin when the movable storage device 400 is connected to an MMC host and operates in an SPI mode. Also, the data pin 402 is used as a command CMD pin in the MMC mode, and used as an input data signal DI pin in the SPI mode. Additionally, the data pins 405 and 407 are each used as a clock signal CLK pin and a data signal DAT pin, respectively, in the MMC mode, and are each used as a clock signal pin SCLK and an output signal DO pin, respectively, in the SPI mode.

Here, the data pin 401 is used as a host distinguishing pin initially when the movable storage device 400 is connected to a host and after the movable storage device 400 decides the type of the connected host, the data pin 401 is used as an ordinary data pin.

In short, the USB interface controller 430 and the MMC interface controller 440 share the data pins 401, 402, 405, and 407 and the power pins 403, 404, and 406.

The level sensing circuit 410 includes a first pull-up resistance R1 and a first switching circuit SW1. The first switching circuit SW1 can be embodied as a NMOS transistor. In FIG. 8, the first switching circuit SW1 is shown as the NMOS transistor. An internal voltage VDD and a drain of the NMOS transistor SW1 are respectively connected to ends of the first pull-up resistance R1.

A control signal SEL is inputted to a gate of the NMOS transistor SW1, and a source of the NMOS transistor SW1 is connected to the input line IL. The NMOS transistor SW1 is either turned on or off in response to the control signal SEL. Thus, the first pull-up resistance R1 is connected in parallel to the input line IL or separated from the input line IL. The operation of the level sensing circuit 410 will be described in more detail with reference to FIGS. 9A through 9C.

Figure 9A:
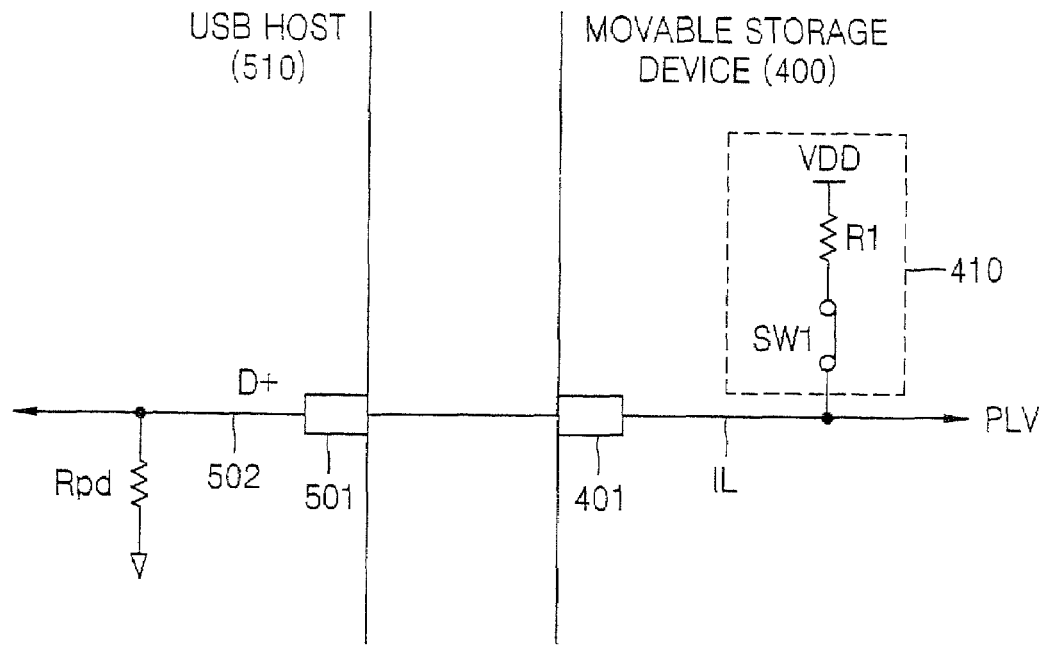
FIG. 9A is a view to explain an operation of a level sensing circuit when the movable storage device of FIG. 8 is connected to a USB host.

FIG. 9A is a view to explain an operation of a level sensing circuit when the movable storage device of FIG. 8 is connected to a USB host. Referring to FIG. 9A, the data pin 401 of the movable storage device 400 is connected to a data pin 501 of a USB host 510. A pull-down resistance Rpd for a bus is usually connected in parallel to an inner data bus 502 which is connected to the data pin 501. The reason for doing so is to maintain the data bus 502 low in an initial state.

When the movable storage device 400 is connected to the USB host 510, the level sensing control unit 420 outputs the control signal SEL at a high level and turns on the NMOS transistor SW1. As a result, the first pull-up resistance R1 is connected in parallel to the input line IL of the data pin 401. Here, since the data bus 502 is low in an initial state, an initial input signal PLV is also low.

The first pull-up resistance R1 is set to have a resistance value much larger than the pull-down resistance for the bus Rpd so that the first pull-up resistance R1 does not effect the level of the initial input signal PLV. If the first pull-up resistance R1 has a resistance value smaller than the pull-down resistance for the bus Rpd, when the internal voltage VDD is divided by the first pull-up resistance R1 and the pull-down resistance for the bus Rpd, a much higher voltage is dropped to the pull-down resistance for the bus Rpd than the first pull-up resistance R1. Consequently, the initial input signal PLV is changed from low to high.

Figure 9B:
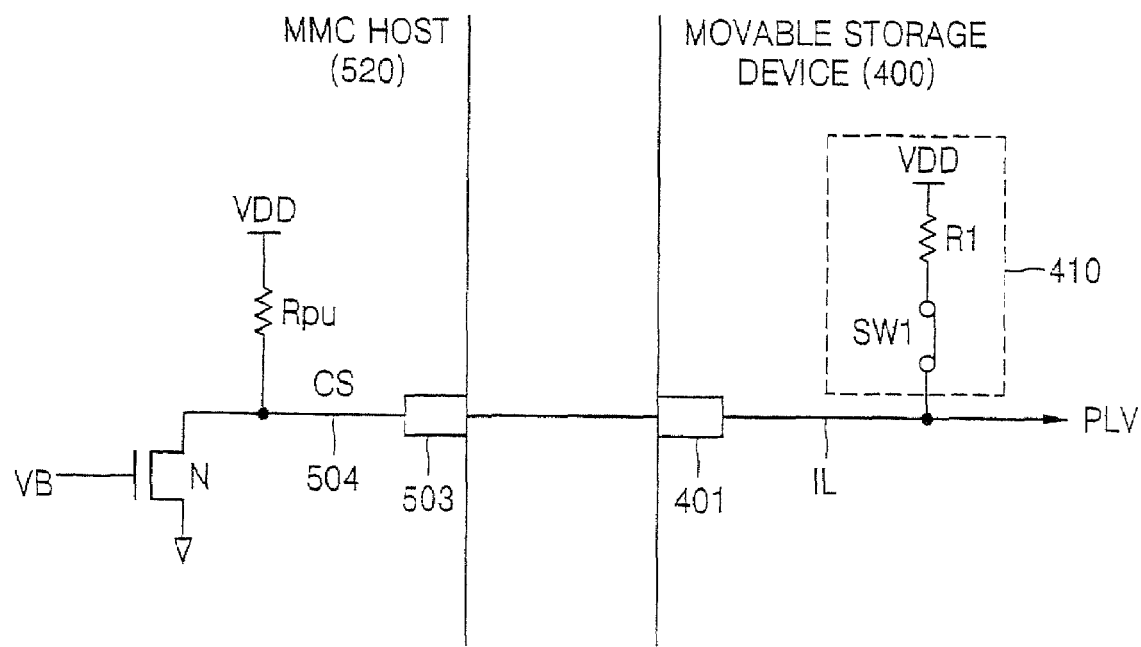
FIGS. 9B and 9C are views to explain an operation of a level sensing circuit when the movable storage device of FIG. 8 is connected to an MMC host.
Figure 9C:
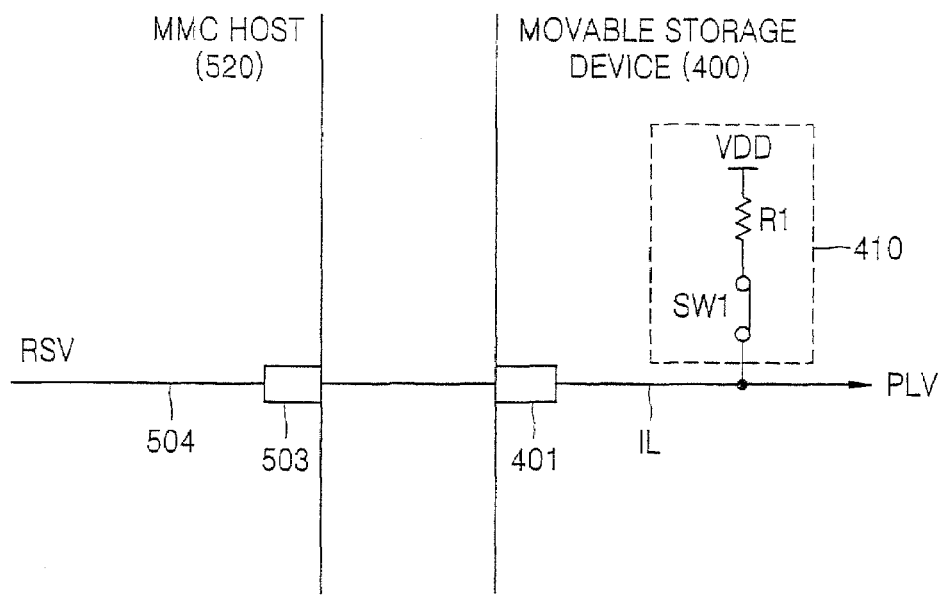

FIGS. 9B and 9C are views to explain an operation of the level sensing circuit when the movable storage device of FIG. 8 is connected to an MMC host. In more detail, FIG. 9B shows an MMC host 520 and the movable storage device 400 operating in an SPI mode and FIG. 9C shows an MMC host 520 and the movable storage device 400 operating in an MMC mode.

Referring to FIG. 9B, a pull-up resistance for a bus Rpu is usually connected in parallel to an inner data bus 504 which is connected to a data pin 503 of the MMC host 520. The internal voltage VDD and a drain of an open drain NMOS transistor N are respectively connected to ends of the pull-up resistance for the bus Rpu. A bias voltage VB is inputted to a gate of the open drain NMOS transistor N and a source of it is connected to a ground voltage. Initially, the open drain NMOS transistor N is turned off. Thus, the initial state of the inner data bus 504 of the MMC host 520, i.e., the chip selection signal CS, is maintained high by the pull-up resistance for the bus Rpu.

When the movable storage device 400 is connected to the MMC host 520, the level sensing control unit 420 outputs the control signal SEL at a high level. In response to the control signal SEL, the first switching circuit SW1 is turned on. As a result, the first pull-up resistance R1 is connected in parallel to the input line IL of the data pin 401. Here, the data bus 504 is high in an initial state, so the initial input signal PLV is also high.

Next, referring to FIG. 9C, the data pin 503 of the MMC host 520 is not used in the MMC mode. Therefore, the data bus 504 inside the MMC host 520 is in a floating state. Here, the level sensing circuit 410 operates in a similar way as described with reference to FIG. 9A. As a result, the first pull-up resistance R1 is connected in parallel to the input line IL of the data pin 501. Then, the initial input signal PLV becomes high by the first pull-up resistance R1 because the data bus 504 is in a floating state in an initial state.

Again referring to FIG. 8, the level sensing control unit 420 outputs the control signal SEL at a high level when the movable storage device 400 is connected to a specific host. Also, the level sensing control unit 420 changes the level of the control signal SEL in response to the initial input signal PLV, which is received through the data pin 401 and the input line IL. The level sensing control unit 420 maintains a level of the control signal SEL until the movable storage device 400 is separated from the host. In more detail, the level sensing control unit 420 maintains the control signal SEL high when the initial input signal PLV is high, and maintains the control signal SEL low when the initial input signal PLV is low.

The MMC interface controller 440 is enabled when the control signal SEL is high, and the USB interface controller 430 is enabled when the control signal SEL is low.

The interface selection unit 450 selects one of output signals of the USB interface controller 430 and the MMC interface controller 440 and outputs it to the memory controller 460 in response to the control signal SEL.

The memory controller 460 exchanges data with the host that is connected through one of the USB interface controller 430 and the MMC interface controller 440, which are selected by the interface selection unit 450. In addition, the memory controller 460 controls read and write operations of data to and from the flash memory 470 and erase operation of the data stored in the flash memory 470. The flash memory 470 carries out read, write, and erase operations of data under a control of the memory controller 460.

The recognition signal for the USB host generation circuit 480 is either connected in parallel to the input line IL or separated from the input line IL in response to the control signal SEL. The recognition signal for the USB host generation circuit 480 is connected to the input line IL only when the movable storage device 400 is connected to the USB host. The recognition signal for the USB host generation circuit 480 includes a second pull-up resistance R2 and a second switching circuit SW2. The second switching circuit SW2 can be embodied as a PMOS transistor. In FIG. 8, the second switching circuit SW2 is shown as a PMOS transistor. The internal voltage VDD and source of the PMOS transistor SW2 are respectively connected to ends of the second pull-up resistance R2. The control signal SEL is inputted to a gate of the PMOS transistor SW2 and a drain of it is connected to the input line IL. The PMOS transistor SW2 is either turned on or off in response to the control signal SEL. Thus, the second pull-up resistance R2 is connected in parallel to the input line IL or separated from the input line IL.

Figure 10:
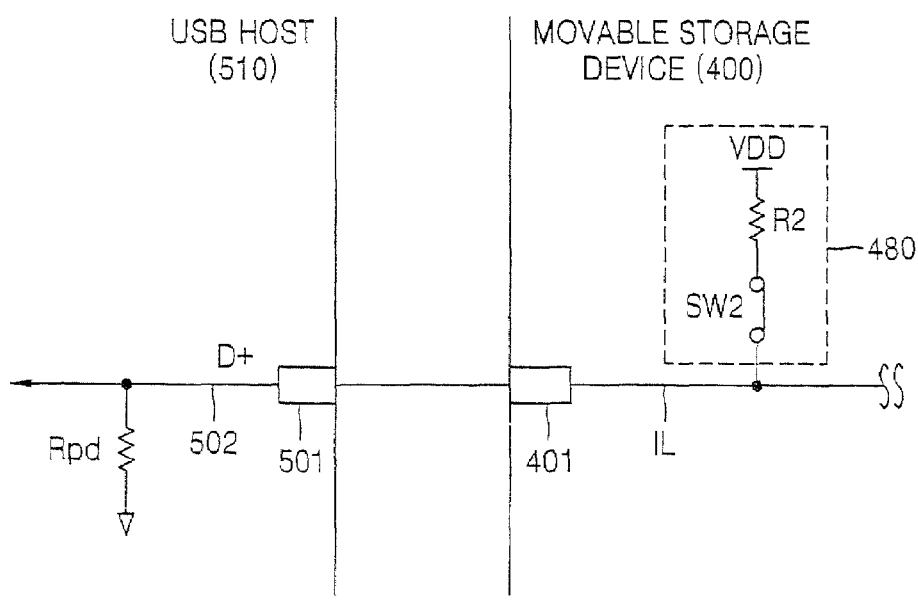
FIG. 10 is a view to explain an operation of a recognition signal for a USB host generation circuit when the movable storage device of FIG. 8 is connected to the USB host.

The operation of the recognition signal for the USB host generation circuit 480 will be described in more detail with reference to FIG. 10. FIG. 10 is a view to explain the operation of the recognition signal for the USB host generation circuit 480 when the movable storage device 400 of FIG. 8 is connected to the USB host 510. Referring to FIG. 10, the pull-down resistance for the bus Rpd is connected in parallel to the inner data bus 502 that is connected to the data pin 501 of the USB host 510, as described with reference to FIG. 9A. The level sensing control unit 420 outputs the control signal SEL at a low level when the movable storage device 400 operates in the USB host mode, and the second switching circuit SW2 is turned on in response to the control signal SEL. Consequently, the second pull-up resistance R2 is connected in parallel to the input line IL of the data pin 401.

Here, the second pull-up resistance R2 is set to have a smaller resistance value than the pull-down resistance for the bus Rpd. As a result, the internal voltage VDD is divided by the pull-down resistance for the bus Rpd and the second pull-up resistance R2, and an input data signal D+ received through the data bus 502 changes from low to high. When the level of the input data signal D+ changes, the USB host 510 recognizes that the movable storage device 400 is connected.

Next, the operation process of the movable storage device 400 with previous mentioned features will be described. First, when power is supplied after the movable storage device 400 is connected to the USB host 510 or the MMC host 520, the level sensing control unit 420 outputs the control signal SEL at a high level. As a result, the first switching circuit SW1 is turned on and the first pull-up resistance R1 of the level sensing circuit 410 is connected in parallel to the input line IL of the host distinguishing pin, i.e., the data pin 401. Afterwards, the level sensing control unit 420 decides the level of the initial input signal PLV that is received through the data pin 401.

The initial input signal PLV becomes high when the movable storage device 400 is connected to the MMC host 520 because the data bus 504 of the MMC host 520 is high or a floating state. The level sensing control unit 420 maintains the control signal SEL high because the initial input signal PLV is high. The level sensing control unit 420 maintains the control signal SEL high until the movable storage device 400 is separated from the MMC host 520.

The MMC host interface controller 440 is enabled in response to the control signal SEL. Also, the interface selection unit 450 connects the MMC host interface controller 440 and the memory controller 460 in response to the control signal SEL. Furthermore, the first switching circuit SW1 continues to remain turned on because the control signal SEL is high. Subsequently, the first pull-up resistance R1 maintains a state in which it is connected in parallel to the input line IL. Here, the reason why the first pull-up resistance R1 remains connected with the input line IL even after the level sensing control unit 420 decides the level of the initial input signal PLV is to change the input line IL in a floating state to high and maintain the input line IL as high when the movable storage device 400 operates in the MMC mode. Then, the movable storage device 400 operates in the MMC host interface mode.

Next, the operation of the movable storage device 400 when the movable storage device 400 is connected to the USB host 510 will be described. When power is supplied after the movable storage device 400 is connected to the USB host 510, the level sensing control unit 420 outputs the control signal SEL at a high level initially. The first switching circuit SW1 is turned on in response to the control signal SEL, and the first pull-up resistance R1 of the level sensing circuit 410 is connected in parallel to the input line IL of the data pin 401 (i.e. the host distinguishing pin). Afterwards, the level sensing control unit 420 decides the level of the initial input signal PLV that is received through the data pin 401. Since the bus for an input data signal D+ 502 of the USB host 510 is initially low, the initial input signal PLV is also low.

The level sensing control unit 420 decides that the initial input signal PLV is low and outputs the control signal SEL at a low level. Then, the level sensing control unit 420 maintains the control signal SEL low until the movable storage device 400 is separated from the USB host 510.

The USB interface controller 430 is enabled in response to the control signal SEL. Also, the interface selection unit 450 connects the USB interface controller 430 and the memory controller 460 in response to the control signal SEL. Again, in response to the control signal SEL, the second switching circuit SW2 of the recognition signal for the USB host generation circuit 480 is turned on, and the second pull-up resistance R2 is connected to the input line IL of the data pin 401.

Additionally, in response to the control signal SEL, the first switching circuit SW1 is turned off, and the first pull-up resistance R1 is separated from the input line IL. Then, the movable storage device 400 operates in the USB host interface mode.

As described above, the movable storage device 400 automatically recognizes the type of the connected host when the movable storage device 400 is connected to the MMC host 520 or the USB host 510, and can operate in a corresponding host interface mode.

Figure 11:
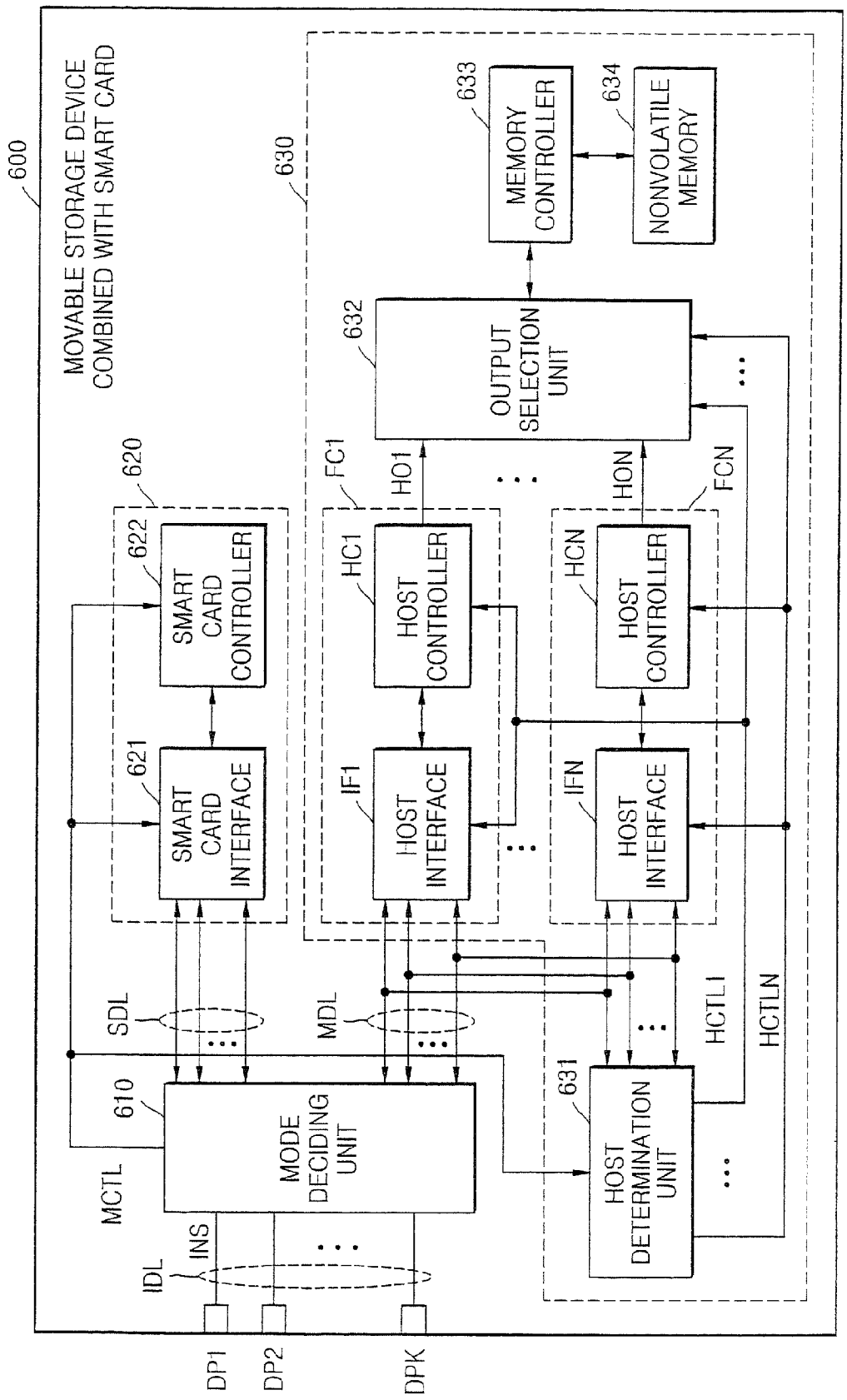
FIG. 11 is a block diagram of a movable storage device combined with a smart card according to another embodiment of the invention.

FIG. 11 is a block diagram of a movable storage device combined with a smart card according to another embodiment of the invention. Referring to FIG. 11, a movable storage device combined with a smart card 600 includes a mode deciding unit 610, a smart card module 620, and a memory card module 630. The mode deciding unit 610 is connected to a plurality of signal pins DP1 through DPK (K is a natural number larger than 1) by input data lines IDL. The signal pins DP1 through DPK include pins for data signals, power pins, and pins for control signals.

The mode deciding unit 610 decides the level of a first initial input signal INS which is received through the signal pin DP1. The mode deciding unit 610 output a mode control signal MCTL according to the level of the first initial input signal INS to decide one of a smart card mode and a memory card mode of the movable storage device combined with the smart card 600.

Here, the signal pin DP1 is used as a mode distinguishing pin in the beginning and as a data pin after the mode deciding unit 610 decides an operation mode of the movable storage device combined with the smart card 600. In FIG. 11, although the signal pin DP1 is shown as a mode distinguishing pin as one example, any one of the signal pins DP2 through DPK can be used as the mode distinguishing pin. Also, the first initial input signal INS shows an initial state of a data bus of a host that is connected to the movable storage device combined with the smart card 600. Additionally, the mode deciding unit 610 connects the input data lines IDL with one of smart card data lines SDL and memory card data lines MDL. Here, the smart card module 620 and the memory card module 630 share the pins for distinguishing modes and power pins among the signal pins DP1 through PDK. In addition, the smart card module 620 and the memory card module 630 can share a part of or all of the signal pins DP1 through PDK.

The smart card module 620 includes a smart card interface 621 and a smart card controller 622. The smart card interface 621 is connected to the mode deciding unit 610 by the smart card data lines SDL. The smart card interface 621 and the smart card controller 622 are enabled or disabled in response to the mode control signal MCTL. In a smart card mode, the smart card controller 622 carries out a command received from a smart card host (not shown) through the smart card interface 621, and exchanges data with the smart card host.

The memory card module 630 includes a host determination unit 631, a plurality of host interface control units FC1 through FCN, an output selection unit 632, a memory controller 633, and a nonvolatile memory 634. The host determination unit 631 is connected to the memory card data lines MDL. The host determination unit 631 is either enabled or disabled in response to the mode control signal MCTL. In a memory card mode, the host determination unit 631 decides the level of a second initial input signal (not shown) which is received from pins for distinguishing a host among the signal pins DP1 through DPK.

Here, the signal pins DP1 through DPK includes at least one host distinguishing pin. FIG. 11 shows a case where all the signal pins DP1 through DPK are used as the pins for distinguishing a host. However, only some of the signal pins DP1 through DPK can be the pins for distinguishing a host. Also, the pins for distinguishing a host are used as ordinary data pins after the host determination unit 631 recognizes the type of the connected memory card host.

The host determination unit 631 determines the type of the memory card host which is connected according to the level of the second initial input signals received through the pins for distinguishing a host DP1 through DPK. Here, the second initial input signal shows an initial state of a data bus of the connected memory card host.

The host determination unit 631 recognizes the type of the memory card host which is connected according to the levels of the second initial input signals and outputs selection control signals HCTL1 through HCTLN (N is a natural number larger than 1). Here, the host determination unit 631 enables and outputs one of the selection control signals HCTL1 through HCTLN in order to select a host interface control unit that corresponds to a connected memory card host.

The host interface control units FC1 through FCN are each connected to the memory card data lines MDL, and are either enabled or disabled in responds to the selection control signals HCTL1 through HCTLN. Also, the host interface control units FC1 through FCN include host interfaces IF1 through IFN and host controllers HC1 through HCN.

The output selection unit 632 exchanges data with an enabled host interface control unit, among the host interface control units FC1 through FCN, and the memory controller 633 in response to the selection control signals HCTL1 through HCTLN.

In a memory card mode, the memory controller 633 exchanges data with a memory card host through the enabled host interface control unit, and controls read, write, and erase operations of data of the nonvolatile memory 634.

Figure 12:
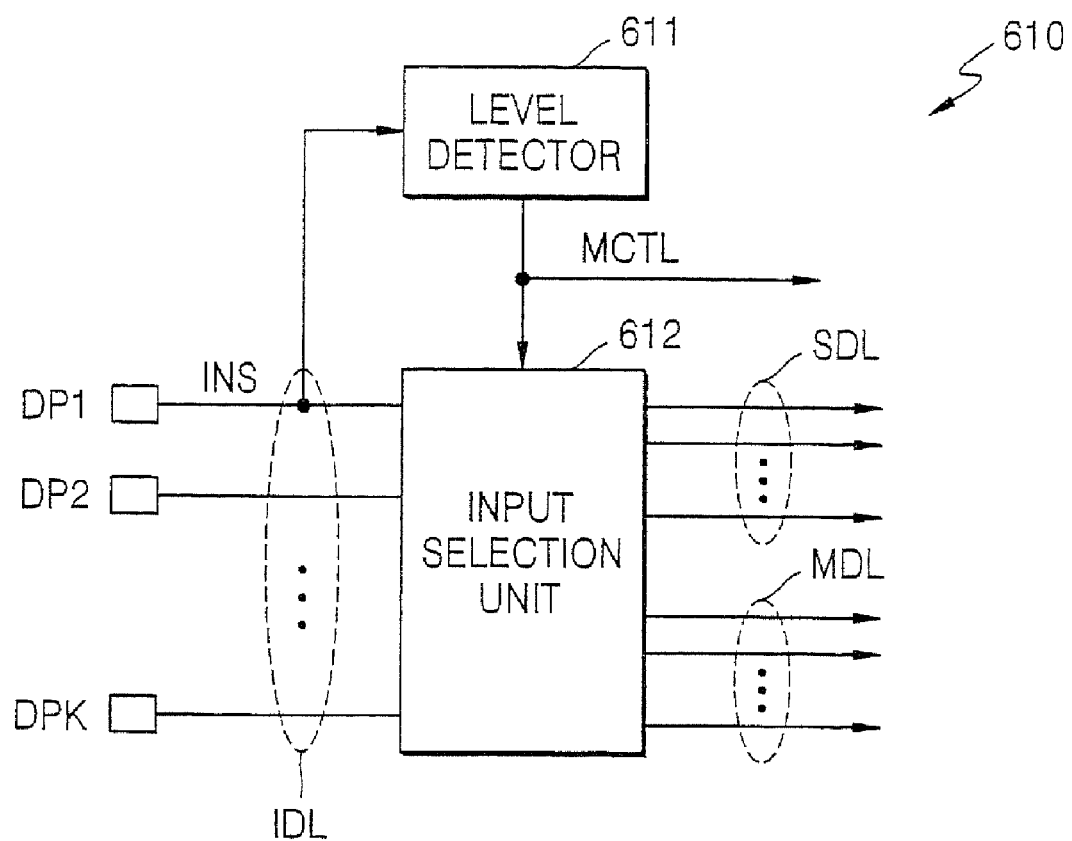
FIG. 12 is a detailed view of a mode deciding unit of FIG. 11.

FIG. 12 is a detailed view of the mode deciding unit 610 of FIG. 11. Referring to FIG. 12, the mode deciding unit 610 includes a level detector 611 and an input selection unit 612. The level detector 611 decides the level of the first initial input signal INS which is received through the signal pin DP1, and according to the results, determine an operation mode of the movable storage device combined with the smart card 600 by outputting a mode control signal MCTL. Here, when the movable storage device combined with the smart card 600 is connected to a host, the level detector 611 maintains the output of the mode control signal MCTL until the movable storage device combined with the smart card 600 is separated from the host, after the level detector 611 decides the level of the first initial input signal INS once and determines an operation mode. Also, after the level detector 611 determines an operation mode, the signal pin DP1 is used as a data pin.

The input selection unit 612 is connected to the signal pins DP1 through DPK by the input data lines IDL. The input selection unit 612 connects the input data lines IDL to one of the smart card data lines SDL and the memory card data lines MDL in response to the mode control signal MCTL.

Figure 13:
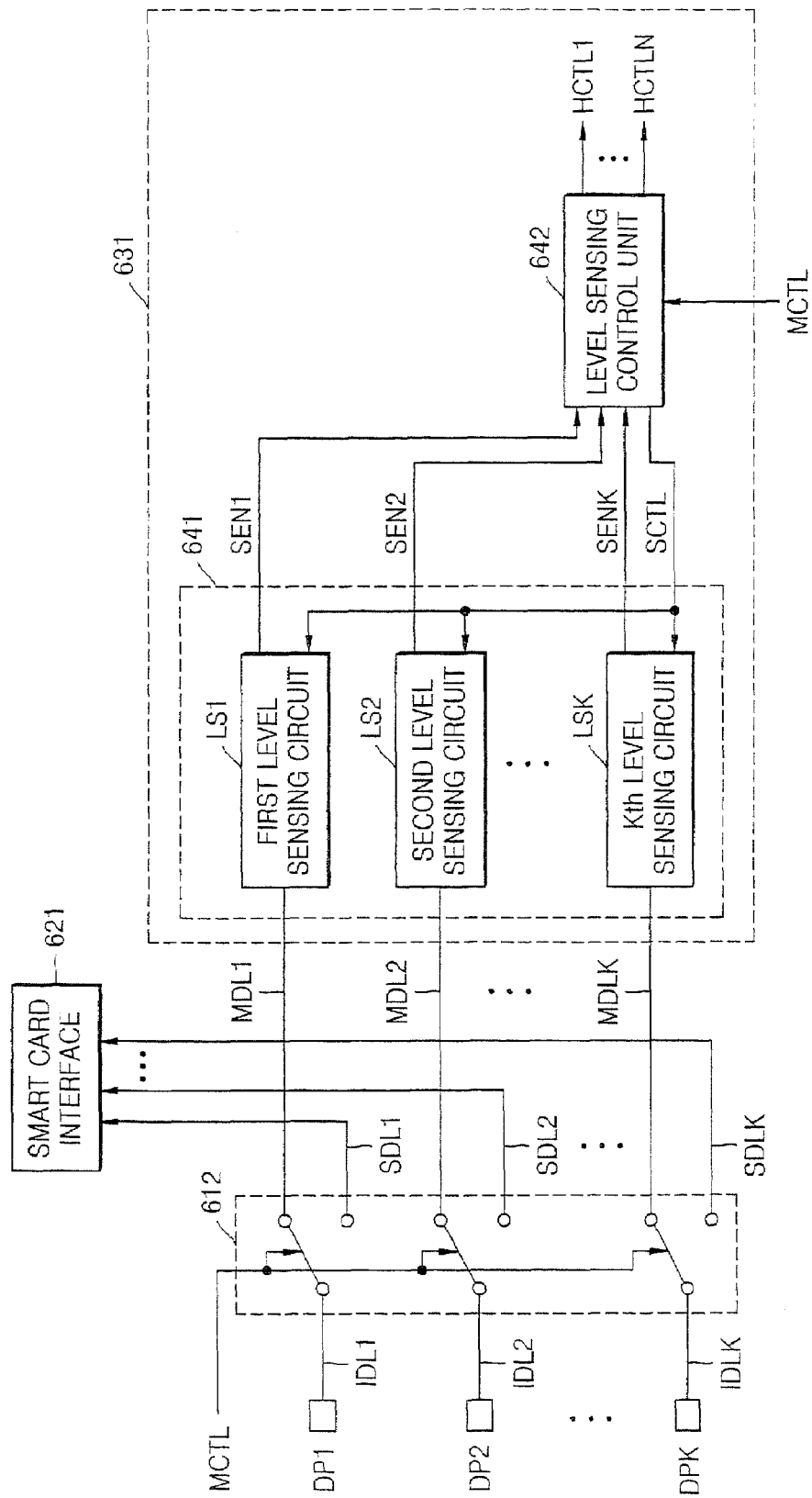
FIG. 13 is a view of a host determination unit and a smart card interface of FIG. 11, and an input selection unit of FIG. 12.

FIG. 13 is a view of the host determination unit 631 and the smart card interface 621 of FIG. 11 and the input selection unit 612 of FIG. 12. Referring to FIG. 13, the host determination unit 631 includes a level sensing unit 641 and a level sensing control unit 642. The level sensing unit 641 has a first through $K_{th}$ level sensing circuits LS1 through LSK (K is an integer larger than 1). Here, the level sensing unit 641 has the same number of level sensing circuits as the number of pins for distinguishing a host. In FIG. 13, all signal pins DP1 through DPK used as pins for distinguishing a host is described as an example.

The first through $K_{th}$ level sensing circuits LS1 through LSK are each connected to memory card data lines MDL1 through MDLK in response to a sensing control signal SCTL. In a memory card mode, the memory card data lines MDL1 through MDLK are connected to input data lines IDL1 through IDLK by the input selection unit 612. The input selection unit 612 in FIG. 13 is illustrated as a generalized example for the convenience of explaining.

In response to a mode control signal MCTL, the level sensing control unit 642 outputs the sensing control signal SCTL to the first through $K_{th}$ level sensing circuits LS1 through LSK. Afterwards, the level sensing control unit 642 determines the level of a second initial input signals SEN1 through SENK, which are received through the first through $K_{th}$ level sensing circuits LS1 through LSK. Here, the second initial input signals SEN1 through SENK show initial state of data buses of the connected memory card host.

The level sensing control unit 642 determines the type of the memory card host which is connected according to the level of the second initial input signals SEN1 through SENK and outputs selection control signals HCTL1 through HCTLN. Here, the level sensing control unit 642 enables and outputs one of the selection control signals HCTL1 through HCTLN in order to enable a host interface control unit that corresponds to the determined memory card host.

The structure and detailed operation description of the first through $K_{th}$ level sensing circuits LS1 through LSK of the level sensing unit 641 are omitted because they are substantially the same as the structure and operation of the first level sensing circuit LS1 of FIGS. 4A through 4C.

Figure 14A:
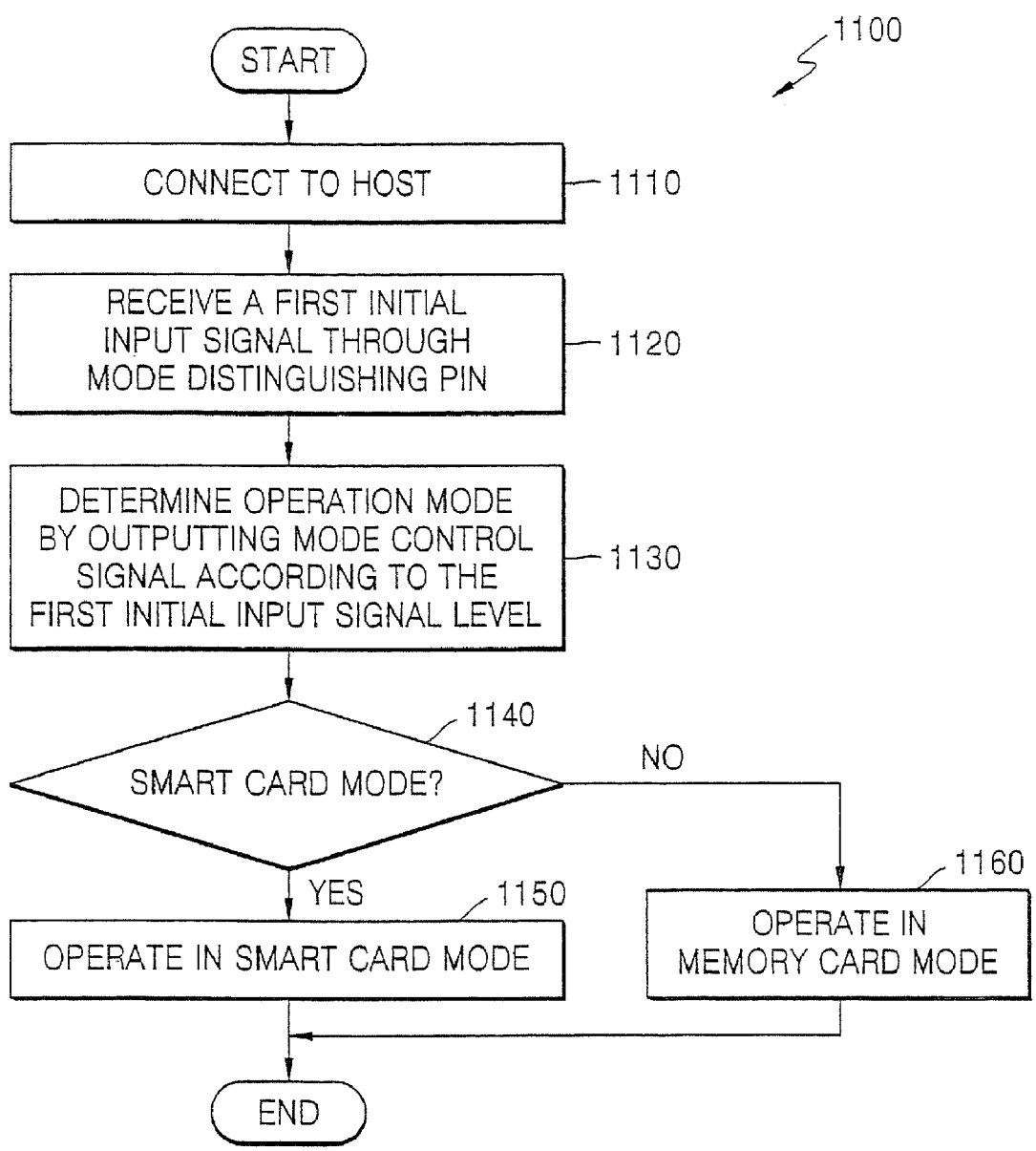
FIG. 14A is a flowchart of an interfacing process of the movable storage device combined with the smart card of FIG. 11.

FIG. 14A is a flowchart of an interfacing process 1100 of the movable storage device combined with the smart card 600 of FIG. 11. Referring to FIG. 14A, the signal pins DP1 through DPK of the movable storage device combined with the smart card 600 connect to the data pins of the host (Step 1110). Here, a part of the signal pins DP1 through DPK can be used as the pins for distinguishing mode. In FIG. 14A, the signal pin DP1 used as the mode distinguishing pin is described as an example.

The level detector 611 of the mode deciding unit 610 of the movable storage device combined with the smart card 600 receives the first initial input signal INS through the mode distinguishing pin DP1 (Step 1120). The level detector 611 decides the level of the first initial input signal INS. The level detector 611 determines an operation mode by outputting the mode control signal MCTL according to the level of the first initial input signal INS (Step 1130). Meanwhile, the input selection unit 612 of the mode deciding unit 610 connects the input data lines IDL, which are connected to the signal pins DP1 through DPK, to one of the smart card data lines SDL and the memory card data lines MDL in response to the mode control signal MCTL.

Then, the input selection unit 612 determines whether the smart card mode is determined in Step 1130 (Step 1140). When the smart card mode is determined in Step 1140, the movable storage device combined with the smart card 600 operates in the smart card mode (Step 1150).

In the smart card mode, the smart card interface 621 and the smart card controller 622 of the movable storage device combined with the smart card 600 are enabled in response to the mode control signal MCTL. Since those with ordinary skill in the related art can understand the operation of the smart card, the detailed operation process of Step 1150 is omitted.

Also, when the smart card mode is not determined in Step 1140, i.e., when the memory card mode is determined, the movable storage device combined with the smart card 600 operates in the memory card mode (Step 1160).

Figure 14B:
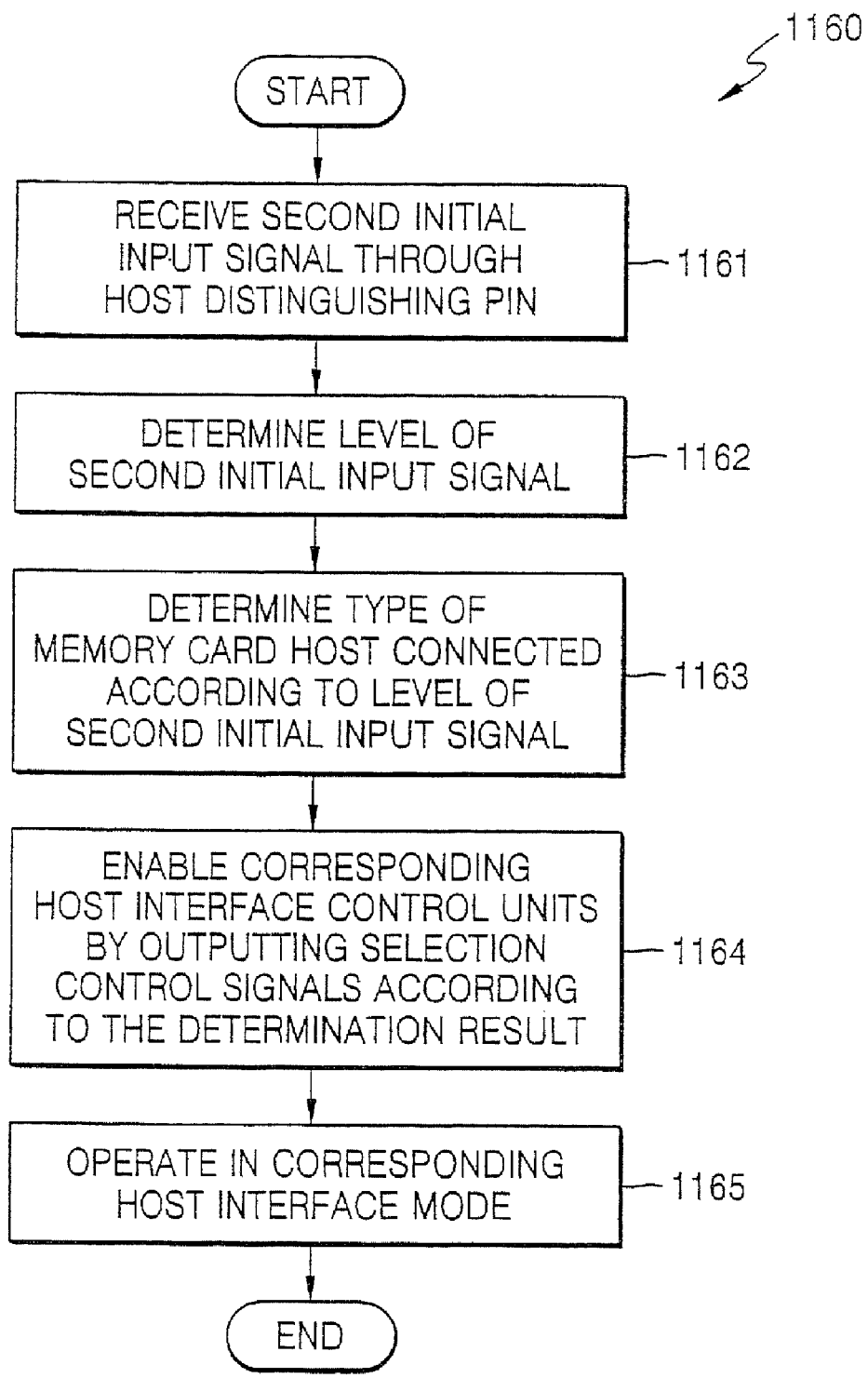
FIG. 14B is a flowchart of an operating process in a memory card mode of FIG. 14A.

FIG. 14B is a flowchart of a process of operating in a memory card mode of FIG. 14A in detail. Referring to FIG. 14B, the host determination unit 631 of the memory card module 630 receives the second initial input signal through the host distinguishing pin (Step 1161). Here, some or all of the signal pins DP1 through DPK can be used as the host distinguishing pin. In FIG. 14B, the signal pin DP1 used as the host distinguishing pin is described as an example.

The host determination unit 631 is connected to the memory card data line MDL1. The memory card data line MDL1 is connected to the input data line IDL1 by the input selection unit 612 of the mode deciding unit 610. Subsequently, the host determination unit 631 is connected to the host distinguishing pin DP1 by the memory card data line MDL1 and the input data line IDL1. The host determination unit 631 decides the level of the second initial input signal SEN 1 which is received through the host distinguishing pin DP1 (Step 1162). Step 1162 will be described in more detail later with reference to FIG. 14C.

The host determination unit 631 determines the type of the memory card host which is connected according to the level of the second initial input signal SEN1 (Step 1163). Then, according to the determination result, the host determination unit 631 enables one of the host interface control units FC1 through FCN by outputting the selection control signals HCTL1 through HCTLN (Step 1164). Afterwards, the movable storage device combined with the smart card 600 operates in a corresponding host interface mode by the enabled host interface control unit (Step 1165).

Figure 14C:
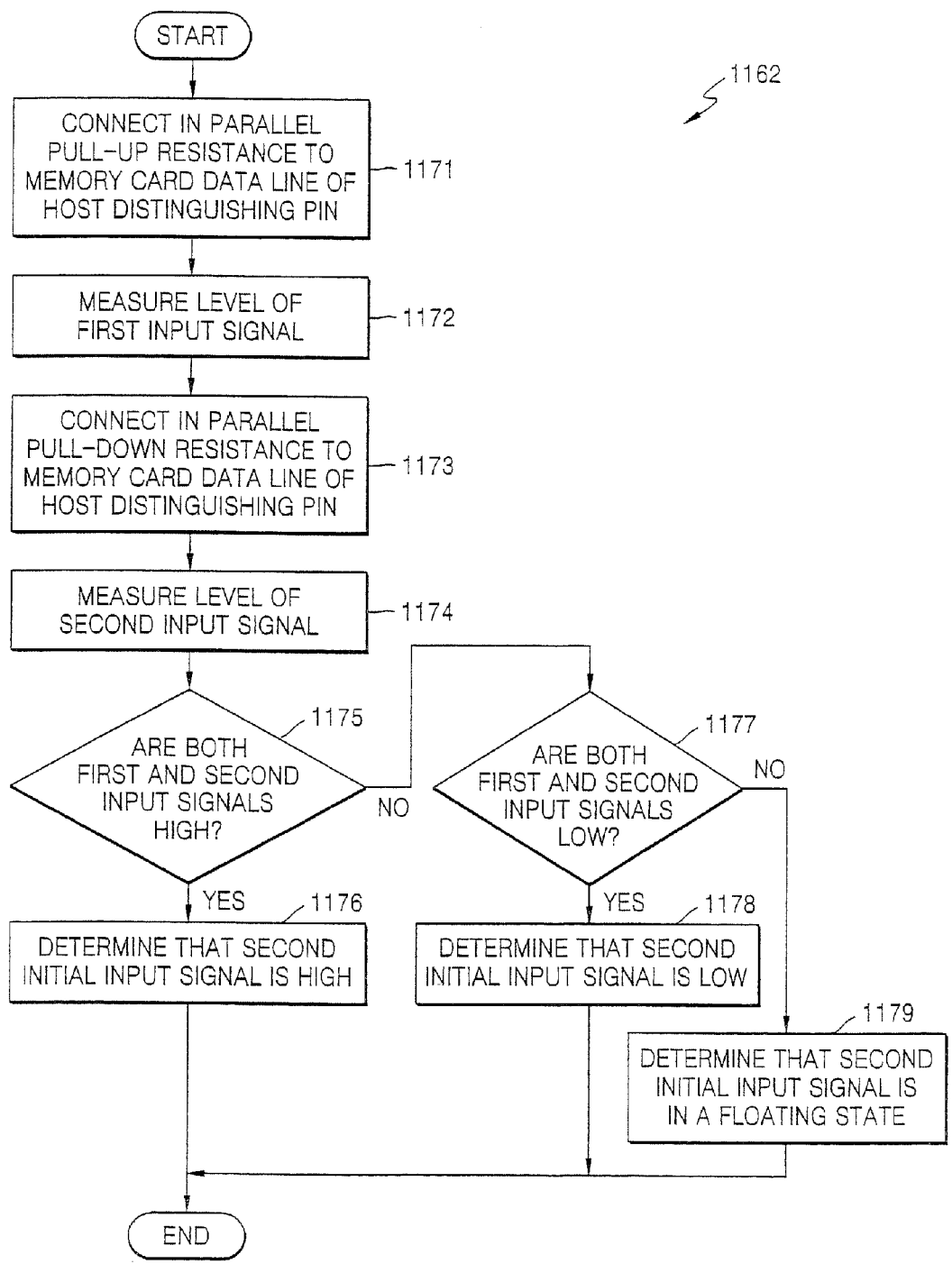
FIG. 14C is a flowchart of a level decision process of a second initial input signal of FIG. 14B.

FIG. 14C is a flowchart of the level decision process 1162 of the second initial input signal of FIG. 14B in detail. In FIG. 14C, the operation of the first level sensing circuit LS1 among the 1 through $K_{th}$ level sensing circuits LS1 through LSK of the host determination unit 631 will be described mainly. Referring to FIG. 14C, the level sensing control unit 642 of the host determination unit 631 enables the sensing control signal SCTL1. Consequently, the PMOS transistor PM1 (see FIG. 4B) of the first level sensing circuit LS1 is turned on, and the pull-up resistance Ru is connected in parallel to the memory card data line MDL1, which is connected to the host distinguishing pin DP1 (Step 1171). Here, the level sensing control unit 642 measures the level of the first input signal IN1, which is outputted from the node SNODE (Step 1172).

Next, the level sensing control unit 642 disables the sensing control signal SCTL1 and enables the sensing control signal SCTL2. As a result, the PMOS transistor PM1 is turned off and the NMOS transistor NM1 of the first level sensing circuit LS1 is turned on, and the pull-down resistance Rd (see FIG.

4C) is connected in parallel to the memory card data line MDL1 (Step 1173). Here, the level sensing control unit 642 measures the level of the second input signal IN2, which is outputted from the node SNODE (Step 1174).

Then, the level sensing control unit 642 determines whether both the first and second input signals IN1 and IN2, respectively, are high (Step 1175). When both the first and second input signals IN1 and IN2, respectively, are high, the level sensing control unit 642 determines that the second initial input signal SEN1 is high (Step 1176).

When both the first and second input signals IN1 and IN2, respectively, are not high in Step 1175, the level sensing control unit 642 determines whether both the first and second input signals IN1 and IN2, respectively, are low (Step 1177). In Step 1177, if both the first and second input signals IN1 and IN2, respectively, are low, the level sensing control unit 642 determines that the second initial input signal SEN1 is low (Step 1178).

On the other hand, in Step 1177, if both the first and second input signals IN1 and IN2, respectively, are not low, i.e., the first input signal IN1 is high and the second input signal IN2 is low, the level sensing control unit 642 determines that the second initial input signal SEN1 is in a floating state (Step 1179).

Here, the level of the second initial input signal SEN1 shows an initial state of the data bus of the connected memory card host, and the initial state of the data bus is different for each host. Therefore, the level sensing control unit 642 determines the type of the memory card host according to the level of the second initial input signal SEN1.

Figures 15, 16A:
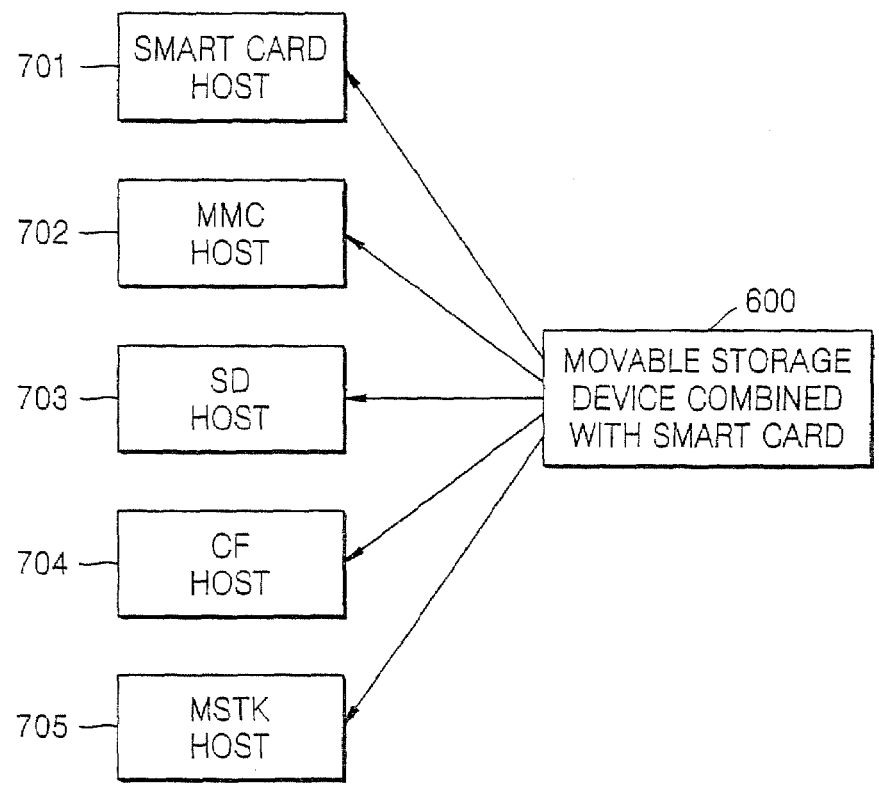
FIG. 15 is a view illustrating relationships between the movable storage device combined with the smart card of FIG. 11 and hosts.
FIG. 16A is a table of specifications of a smart card host.

FIG. 15 is a view illustrating relationships between the movable storage device combined with the smart card of FIG. 11 and hosts. As seen in FIG. 15, the movable storage device combined with the smart card 600 can be connected not only to a smart card host 701 but also to memory card hosts like an MMC host 702, a SD host 703, a CF host 704, and a MSTK host 705. Also, the movable storage device combined with the smart card 600 can be used in all types of hosts apart from hosts that use a movable storage device without a host interface controller.

FIG. 16A is a table of specifications of a smart card host. Referring to FIG. 16A, specifications for signal pins 2, 3, and 4 besides power pins 1 and 5 are shown. The signal pin 2 is used as a reset signal pin RST, and the initial state of a data bus connected to the signal pin 2 is low. The signal pin 3 is used as a clock signal CLK pin, and the initial state of a data bus connected to the signal pin 3 is not prescribed. In addition, the signal pin 4 is used as a data signal 10 pin, and the initial state of a data bus connected to the signal pin 4 is high.

FIG. 16B is a table of specifications of a smart card. Referring to FIG. 16B, the smart card includes five pins I through 5 connected to respectively correspond to each signal pin 1 through 5 of the smart card host. When referring to the specs of the MMC host of FIG. 7A and the smart card host of FIG. 6A, the initial state of the data bus connected to the signal pin 2 which is used for the command signal CMD of the MMC host is different from the initial state of the data bus connected to the signal pin 2 which is used for the reset signal RST of the smart card host.

Therefore, in an MMC that includes a smart card module, when the reset signal RST pin of the smart card module and the command signal CMD pin of the MMC module are used as a single pin, the type of the host is determined according to the level of an initial input signal received from the signal pin when the MMC that includes a smart card module is connected to a host.

Figure 17:
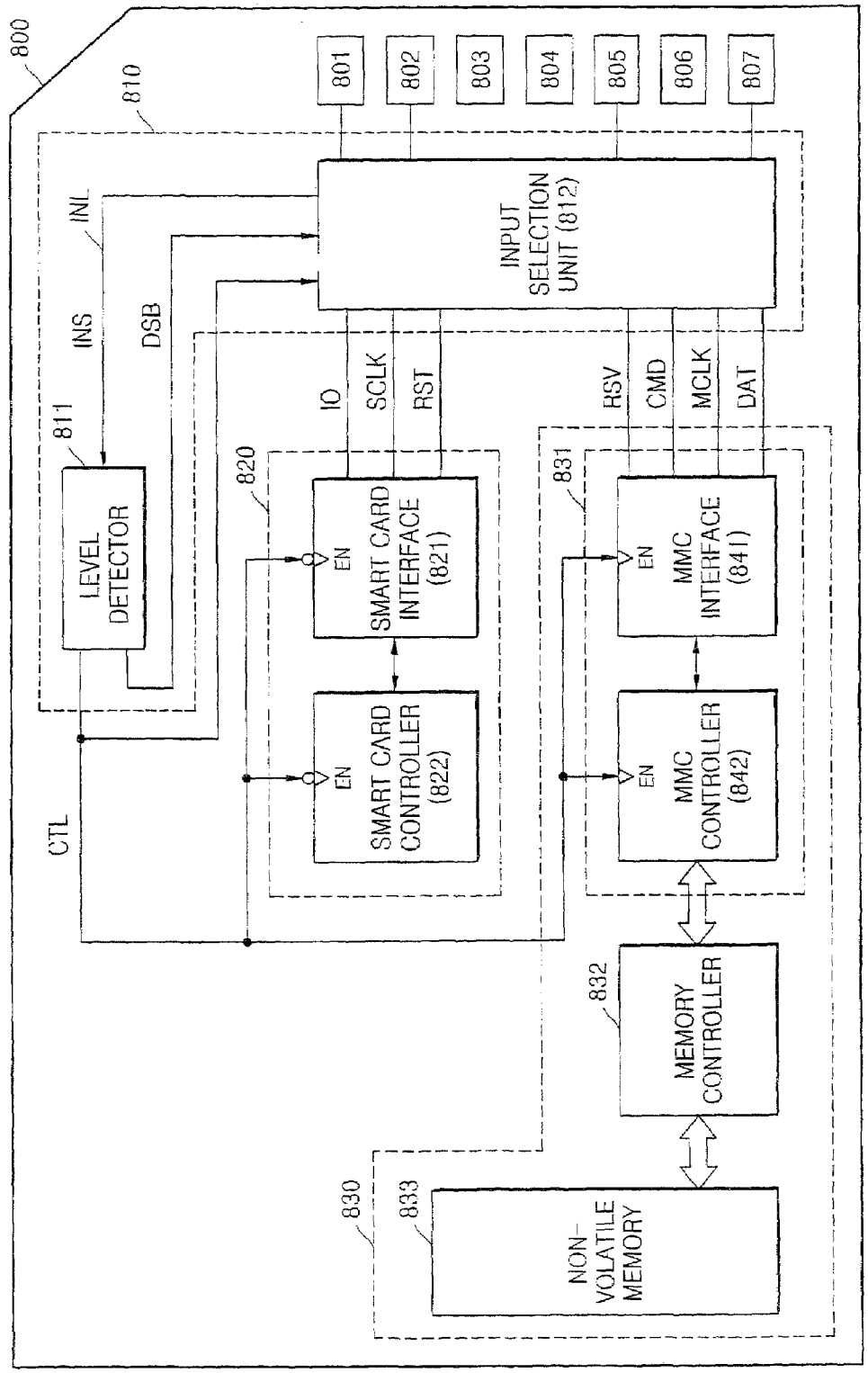
FIG. 17 is a view of a movable storage device combined with a smart card according to another embodiment of the invention.

FIG. 17 is a view of a movable storage device combined with a smart card according to another embodiment of the invention in which a smart card function is added to an MMC. Referring to FIG. 17, a movable storage device combined with a smart card 800 includes signal pins 801 through 807, a mode deciding unit 810, a smart card module 820, and an MMC module 830. The signal pins 803, 804, and 806 are used as pins for supplying power, and the smart card module 820 and the MMC module 830 share signal pins 802, 805, and 807. Also the signal pin 801 is used as a chip selection signal CS pin of the MMC module 830.

The mode deciding unit 810 includes a level detector 811 and an input selection unit 812. When the movable storage device combined with the smart card 800 is connected to a host and is supplied with power, the level detector 811 is enabled, thereby enabling a switching control signal DSB. Then, the level detector 811 decides the level of an initial input signal INS received from an initial input signal line TNL, and according to the results, outputs a mode control signal CTL. After the mode deciding unit 810 decides the type of the connected host, it disables the switching control signal DSB, and is disabled while maintaining the output of the mode control signal CTL.

The input selection unit 812 responds to the mode control signal CTL and connects the signal pins 802, 805, and 807 to one of the smart card module 820 and the MMC module 830. The input selection unit 812 will be described later in more detail with reference to FIG. 18.

The smart card module 820 includes a smart card interface 821 and a smart card controller 822. The smart card interface 821 and the smart card controller 822 are either enabled or disabled in response to the mode control signal CTL. The smart card controller 822 communicates with a smart card host through the smart card interface 821 in a smart card mode.

In addition, the MMC module 830 includes an MMC interface control unit 831, a memory controller 832, and a nonvolatile memory 833. Also, the MMC interface control unit 831 has an MMC interface 841 and an MMC controller 842. The MMC interface 841 and the MMC controller 842 are either enabled or disabled in response to the mode control signal CTL. Since those with ordinary skill in the related art can understand the operation of the MMC module 830, the operation description of the MMC module 830 is omitted.

Figure 18:
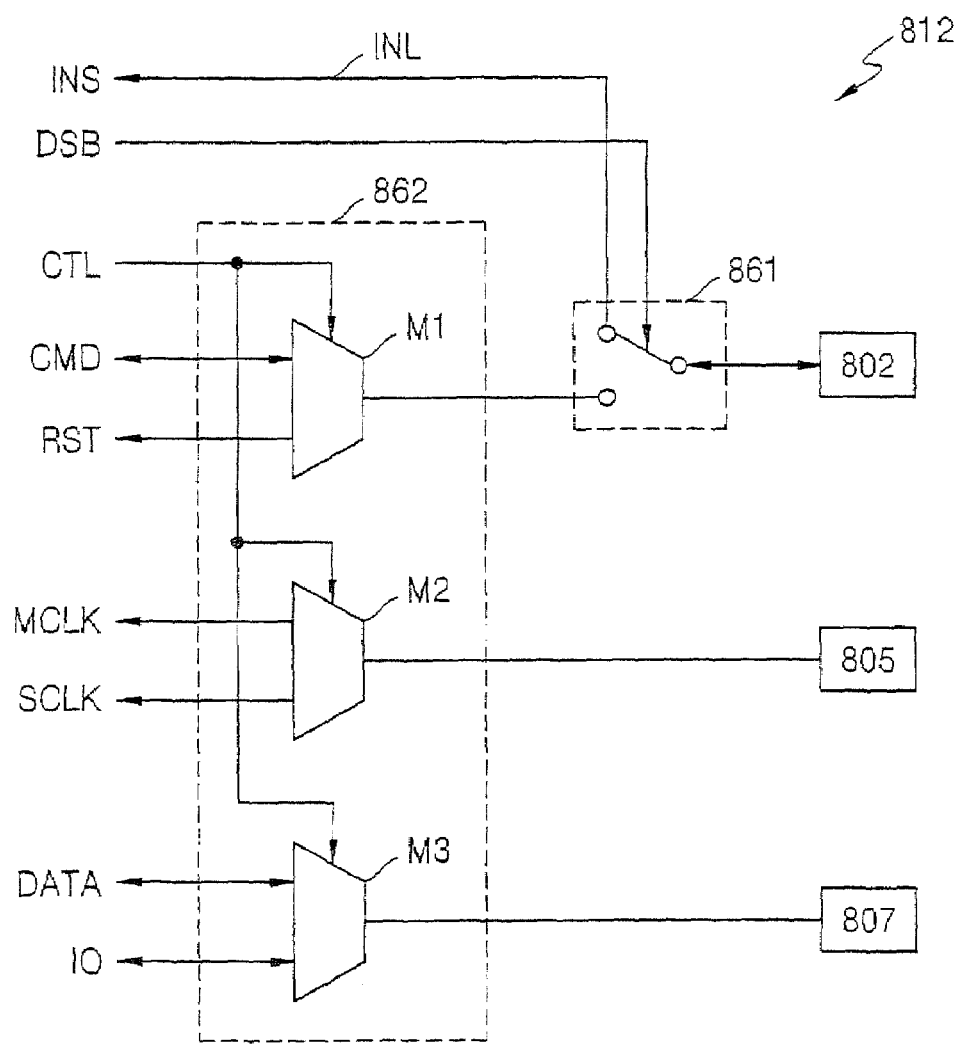
FIG. 18 is a detailed view of an input selection unit of FIG. 17.

FIG. 18 is a detailed view of the input selection unit 812 of FIG. 17. Referring to FIG. 18, the input selection unit 812 includes a switching unit 861 and a MUX circuit unit 862. The MUX circuit unit 862 has MUX circuits M1 through M3.

Initially, the switching unit 861 connects the signal pin 802 and the initial input signal line INL in response to the switching control signal DSB. When the switching control signal DSB is disabled, the switching unit 861 connects the MUX circuit M1 to the signal pin 802.

The MUX circuits M1 through M3 outputs signals received through the signal pins 802, 805, and 807 to one of the smart card module 820 and the MMC module 830 in response to the mode control signal CTL. In more detail, the MUX circuit M1 either outputs a command signal CMD received from the signal pin 802 to the MMC module 830 or outputs a reset signal RST received through the signal pin 802 to the smart card module 820.

The MUX circuit M2 outputs a clock signal MDLK received from the signal pin 805 to the MMC module 830 or outputs a clock signal SCLK received through the signal pin 805 to the smart card module 820. In addition, the MUX circuit M3 outputs a data signal DAT received from the signal pin 807 to the MMC module 830 or outputs a data signal 10 received through the signal pin 807 to the smart card module 820.

Although in FIG. 18, the switching unit 861 is shown connected to the signal pin 802, the switching unit 861 can be connected to the signal pin 807. In this case, the MUX circuit M3 outputs a data signal DAT received from the signal pin 807 to the MMC module 830 or outputs a reset signal RST received through the signal pin 807 to the smart card module 820, and the MUX circuit MI either outputs a command signal CMD received from the signal pin 802 to the MMC module 830 or outputs a data signal 10 received through the signal pin 802 to the smart card module 820.

Next, the operation process of the movable storage device combined with the smart card 800 with previous mentioned features will be described. First, when power is supplied after the movable storage device combined with a smart card 800 is connected to a host, the level detector 811 of the mode decision unit 810 is enabled. In an initial state, the level detector 811 outputs the mode control signal CTL at a high level, and enables a switching control signal DSB.

When the switching control signal DSB is enabled, the switching unit 861 of the input selection unit 812 connects the signal pin 802 and the initial input signal line INL. Also, an MMC interface 841 and an MMC controller 842 are enabled when the mode control signal CTL is in a high level. Therefore, the movable storage device combined with the smart card 800 is set as an MMC mode at an initial state in which power is supplied after connecting to a host.

Afterwards, the level detector 811 decides the level of the initial input signal INS received through the initial input signal line INL. The level detector 811 recognizes that the movable storage device combined with a smart card 800 is connected to an MMC host when the initial input signal INS is high and is disabled while maintaining the output of the mode control signal CTL high. Also, the level detector 811 disables the switching control signal DSB.

When the switching control signal DSB is disabled, the switching unit 861 connects the MUX circuit M1 to the signal pin 802. Then, the movable storage device combined with a smart card 800 operates in an MMC mode.

On the other hand, when the initial input signal INS is in a low level, the level detector 811 recognizes that the movable storage device combined with a smart card 800 is connected to a smart card host and outputs the mode control signal CTL in a low level. Then, the level detector 811 disables the switching control signal DSB, and is disabled while maintaining the output of the mode control signal CTL in a low level.

When the switching control signal DSB is disabled, the switching unit 861 connects the MUX circuit M1 and the signal pin 802. Also, when the mode control signal CTL is low, the MUX circuits M1 through M3 outputs input signals received through the signal pins 802, 805, and 807 to the smart card interface 821. Then, the movable storage device combined with a smart card 800 operates in a smart card mode.

As described above, when the movable storage device combined with the smart card 800 is connected to a host, it automatically recognizes the type of a host and operates in a corresponding host interface mode. Thus, the movable storage device combined with the smart card 800 can be used connected not only to an MMC host but also to a smart card host.

The movable storage device and the movable storage device combined with a smart card capable of being interfaced with multiple hosts, and interfacing methods of the movable storage devices of the invention can be used in a variety of memory card hosts that use different communications protocols from each other or a smart card host.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed:

1. A movable storage device combined with a smart card, comprising:
    a plurality of signal pins that are connected to at least one of a plurality of memory card hosts that use different communications protocols from each other or a smart card host, and at least one signal pin is used as a mode distinguishing pin;
    a mode deciding unit that decides an operation mode of one of a smart card mode and a memory card mode according to a level of a first initial input signal received from the mode distinguishing pin;
    a smart card module that communicates with a smart card host in the smart card mode; and
    a memory card module that can be interfaced with the plurality of memory card hosts, and communicates with one of the plurality of memory card hosts connected in the memory card mode and stores data, wherein the level of the first initial input signal corresponds to an initial state of a data bus for distinguishing mode of a connected host; and
    an initial state of a data bus for distinguishing mode of the smart card host and an initial state of a data bus for distinguishing mode of the memory card host are different from each other;
    wherein the mode distinguishing pin is used as the signal pin after an operation mode is determined by the mode deciding unit; and
    the smart card module and the memory card module share the mode distinguishing pin;
    wherein some or all of a plurality of signal pins are used as the host distinguishing pin, the level sensing unit comprises level sensing circuits that corresponds to each host distinguishing pin, and each of the level sensing circuits includes:
    a pull-up resistance, an end of which being connected to an internal voltage; and
    a switching circuit that connects the pull-up resistance in parallel to the memory card data line in response to the sensing control signal.

2. The movable storage device combined with a smart card of claim 1 wherein the smart card module and the memory card module share some or all of the plurality of signal pins.

3. The movable storage device combined with a smart card of claim 1, wherein the mode deciding unit comprises:
    a level detector that decides a level of the first initial input signal, and outputs a mode control signal according to the results; and
    an input selection unit that is connected to the plurality of signal pins by input data lines, connected to the smart card module by smart card data lines, and connected to the memory card module by memory card data lines, and connects the input data lines to one of the smart card data lines and the memory card data lines in response to the mode control signal.

4. The movable storage device combined with a smart card of claim 3, wherein the smart card module comprises:

a smart card interface that is connected to the input selection unit by the smart card data lines, and is enabled or disabled in response to the mode control signal; and a smart card controller that is enabled or disabled in response to the mode control signal, carries out a command received from the smart card host through the smart card interface, and communicates with the smart card host.

5. The movable storage device combined with a smart card of claim 3, wherein at least one of the plurality of signal pins is used as a host distinguishing pin and the memory card module comprises:

at least one nonvolatile memory that saves data;

host interface control units that are connected to the memory card data lines, and each host interface control unit supporting communication with each memory card host;

a host determination unit that is connected to the memory card data lines, determines a type of a memory card host connected according to a level of a second initial input signal received from the host distinguishing pin in the memory card mode, and enables one of the host interface control units by outputting a selecting control signal;

a memory controller that exchanges data with the memory card host connected by the enabled host interface control unit, and controls read, write, and erase operations of the nonvolatile memory; and an output selection unit that transmits the data between the enabled host interface controller and the memory control units in response to the selection control signal.

6. The movable storage device combined with a smart card of claim 5, wherein the level of the second initial input signal corresponds to an initial state of a data bus for distinguishing host of the connected memory card host, and changes according to types of the connected memory card host.

7. The movable storage device combined with a smart card of claim 5 wherein the host interface control units share some or all of the plurality of signal pins 8. The movable storage device combined with a smart card of claim 5, wherein the host determination unit comprises:

a level sensing unit that is connected in parallel to a memory card data line, which is connected to the host distinguishing pin, in response to a sensing control signal; and a level sensing control unit that generates the sensing control signal in response to the mode control signal, and generates the selection control signal according to the level of the second initial input signal.

9. The movable storage device combined with a smart card of claim 8, wherein some or all of a plurality of signal pins are used as the host distinguishing pin, the level sensing unit comprises level sensing circuits that corresponds to each of the host distinguishing pins, and each of the level sensing circuits includes:

a pull-down resistance, an end of which being connected to a ground voltage; and a switching circuit that connects the pull-down resistance in parallel to the memory card data line in response to the sensing control signal.

10. The movable storage device combined with a smart card of claim 8, wherein some or all of a plurality of signal pins are used as the host distinguishing pin, the level sensing unit comprises level sensing circuits that corresponds to each of the host distinguishing pins, and each of the level sensing circuits includes:

a first sensing circuit that supplies an internal voltage to the memory card data line in response to a first sensing control signal among the sensing control signal; and a second sensing circuit that supplies a ground voltage to the memory card data line in response to a second sensing control signal among the sensing control signals.

11. The movable storage device combined with a smart card of claim 10, wherein the first sensing circuit comprises:

a pull-up resistance, an end of which being connected to the internal voltage; and a first switching circuit that connects the pull-up resistance in parallel to the memory card data line in response to the first sensing control signal, and the second sensing circuit comprises:

a pull-down resistance, and end of which being connected to the ground voltage; and a second switching circuit that connects the pull-down resistance in parallel to the memory card data line in response to the second sensing control signal.

12. The movable storage device combined with a smart card of claim 11, wherein the level sensing control unit determines the level of the initial input signal according to a level of a first input signal, which is received through the memory card data line when the pull-up resistance is connected to the memory card data line, and a level of a second input signal, which is received through the memory card data line when the pull-down resistance is connected to the memory card data line.

13. The movable storage device combined with a smart card of claim 12, wherein the level sensing control unit determines that the initial input signal is high when both the first and second input signals are high, and decides that the initial input signal is low level when both the first and second input signals are low.

14. The movable storage device combined with a smart card of claim 12, wherein the level sensing control unit determines that the initial input signal is in a floating state when the first input signal is high and second input signal is low.

15. The movable storage device combined with a smart card of claim 1, wherein the mode deciding unit carries out a level distinguishing operation of the first initial input signal once in the beginning, and maintains an output of the mode control signal until the mode deciding unit is separated from the host.

16. A movable storage device combined with a smart card, comprising:

a plurality of signal pins, at least one pin being used as a mode distinguishing pin;

a mode deciding unit that decides an operation mode of one of a smart card mode and a multimedia card (MMC) mode according to a level of an initial input signal received from the mode distinguishing pin;

a smart card module that communicates with a smart card host in the smart card mode; and an MMC module that communicates with an MMC host in the MMC mode and stores data, wherein the mode deciding unit comprises:

a level detector that decides a level of the initial input signal, and outputs a mode control signal according to the result; and an input selection unit that is connected to the plurality of signal pins, and outputs input signals received through the a plurality of data pins to one of the smart card module and the MMC module in response to the mode control signal, wherein the level detector enables a switching control signal when connected to a host, and disables the switching control signal after deciding the level of the initial input signal, wherein the input selection unit comprises:

a MUX circuit unit that is connected to the plurality of signal pins, and connects the plurality of signal pins to one of the smart card module and an MMC module in response to the mode control signal; and a switching circuit that connects the mode distinguishing pin and the level detector when the switching control signal is enabled, and connects the mode distinguishing pin and the MUX circuit unit when the switching control signal is disabled.

17. The movable storage device combined with a smart card of claim 16, wherein the level of the initial input signal corresponds to an initial state of a data bus for distinguishing modes of a connected host; and an initial state of a data bus for distinguishing mode of the smart card host and an initial state of a data bus for distinguishing mode of the MMC host are different from each other.

18. The movable storage device combined with a smart card of claim 16, wherein the smart card module and the MMC module share some of the plurality of signal pins.

19. The movable storage device combined with a smart card of claim 16, wherein the smart card module and the MMC module share the mode distinguishing pin; and the mode distinguishing pin is a reset signal pin in the smart card mode, and a command signal pin in the MMC mode.

20. The movable storage device combined with a smart card of claim 16, wherein the smart card module and the MMC module share the mode distinguishing pin; and the mode distinguishing pin is a reset signal pin in the smart card mode, and a data signal pin in the MMC mode.

* * * * *